United States Patent
Schulz et al.

(10) Patent No.: US 10,565,132 B2
(45) Date of Patent: Feb. 18, 2020

(54) DYNAMIC CONFIGURATION AND PERIPHERAL ACCESS IN A PROCESSOR

(71) Applicant: Intel Corporation, Santa Clara, CA (US)

(72) Inventors: Steffen Schulz, Darmstadt (DE); Patrick Koeberl, Alsbach-Haenlein (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/651,886

(22) Filed: Jul. 17, 2017

(65) Prior Publication Data

US 2018/0157603 A1    Jun. 7, 2018

Related U.S. Application Data

(63) Continuation of application No. 14/666,087, filed on Mar. 23, 2015, now Pat. No. 9,710,404.

(51) Int. Cl.
  *G06F 12/00*   (2006.01)
  *G06F 13/00*   (2006.01)
  (Continued)

(52) U.S. Cl.
  CPC .......... *G06F 12/145* (2013.01); *G06F 11/073* (2013.01); *G06F 11/0757* (2013.01);
  (Continued)

(58) Field of Classification Search
  CPC .................... G06F 12/1416; G06F 12/1458
  (Continued)

(56) References Cited

U.S. PATENT DOCUMENTS 9,710,404 B2   7/2017 Schulz et al.
2002/0083282 A1*  6/2002 Yoshino .............. G06F 12/1483
                                                          711/163

(Continued)

FOREIGN PATENT DOCUMENTS

CN        107408068 A    11/2017
EP          1378836 A2    1/2004
WO    WO-2016153683 A1    9/2016

OTHER PUBLICATIONS

"U.S. Appl. No. 14/666,087, Examiner Interview Summary dated Mar. 17, 2017", 1 pg.

(Continued)

*Primary Examiner* — Edward J Dudek, Jr.
*Assistant Examiner* — Sidney Li
(74) *Attorney, Agent, or Firm* — Schwegman Lundberg & Woessner, P.A.

(57) ABSTRACT

In various implementations, a system includes a memory, a processor, and an execution-aware memory protection unit (EA-MPU). The EA-MPU is configured to regulate memory access by the processor based at least on the identity of a subject executable that requests access, and on the address to which access is requested, and on permissions information that identifies which subject executables are to be granted access to each of several memory regions. In various implementations, the permissions information itself is stored among the several memory regions. Various configurations of the permissions information can be used to provide shared memory regions for communication among two or more stand-alone trusted software modules, to protect access to devices accessible through memory-mapped I/O (MMIO), to implement a flexible watchdog timer, to provide security for software updates, to provide dynamic root of trust (Continued)

measurement services, and/or to support an operating system.

25 Claims, 14 Drawing Sheets

(51) Int. Cl.
    *G06F 13/28*     (2006.01)
    *G06F 12/14*     (2006.01)
    *G06F 11/30*     (2006.01)
    *G06F 11/07*     (2006.01)

(52) U.S. Cl.
    CPC ...... *G06F 11/3034* (2013.01); *G06F 11/3037* (2013.01); *G06F 12/1483* (2013.01); *G06F 12/1416* (2013.01); *G06F 12/1458* (2013.01); *G06F 2212/1052* (2013.01)

(58) Field of Classification Search
    USPC .......................................................... 711/152
    See application file for complete search history.

(56) References Cited

U.S. PATENT DOCUMENTS

| | | |
|---|---|---|
| 2002/0147916 A1 | 10/2002 | Strongin et al. |
| 2005/0144408 A1* | 6/2005 | Ejima ................ G06F 21/52 711/163 |
| 2005/0183072 A1 | 8/2005 | Horning et al. |
| 2007/0050580 A1 | 3/2007 | Lewis |
| 2008/0276051 A1* | 11/2008 | Renno ................ G06F 12/1441 711/154 |
| 2009/0049309 A1* | 2/2009 | Brinker ................ G06F 21/57 713/189 |
| 2010/0044755 A1 | 2/2010 | Tsuda et al. |
| 2012/0159259 A1* | 6/2012 | Klein ................ G06F 11/0757 714/38.1 |
| 2012/0215991 A1 | 8/2012 | Moyer |
| 2013/0263277 A1 | 10/2013 | Ely |
| 2015/0032996 A1* | 1/2015 | Koeberl ................ G06F 9/3802 712/205 |
| 2016/0283402 A1 | 9/2016 | Schulz et al. |

OTHER PUBLICATIONS

"U.S. Appl. No. 14/666,087, Non Final Office Action dated Sep. 26, 2016", 35 pgs.
"U.S. Appl. No. 14/666,087, Notice of Allowance dated Mar. 17, 2017", 20 pgs.
"U.S. Appl. No. 14/666,087, Response filed Dec. 27, 2016 to Non-Final Office Action dated Sep. 26, 2016", 12 pgs.
"Embedded system", Wikipedia, (Mar. 13, 2015).
"International Application Serial No. PCT/US2016/019185, International Preliminary Report on Patentability dated Oct. 5, 2017", 10 pgs.
"International Application Serial No. PCT/US2016/019185, International Search Report dated Jun. 29, 2016", 3 pgs.
"International Application Serial No. PCT/US2016/019185, Written Opinion dated Jun. 29, 2016", 11 pgs.
"Physical unclonable function", Wikipedia, (Dec. 27, 2014).
"Trusted computing", Wikipedia, (Mar. 12, 2015).
"Trusted platform module", Wikipedia, (Mar. 19, 2015).
Job, Noorman, et al., "Sancus: Low-cost trustworthy extensible networked devices with a zero-software Trusted Computing Base", 22nd USENIX Security symposium Washington, D.C, (Aug. 14, 2013), 479-494.
Karim, El Defrawy, et al., "SMART: Secure and Minimal Architecture for (Establishing a Dynamic) Root of Trust", NDSS Symposium 2 012, San Diego, (Feb. 8, 2012), 15 pgs.
N, Asokan, et al., "Mobile Trusted Computing", Proceedings of the IEEE, vol. 102, No. 8, (Aug. 2014), 1189-1206.
Patrick, Koeberl, et al., "TrustLite: A Security Architecture for Tiny Embedded Devices", proceedings of Association for Computing Machinery EuroSys '14, Amsterdam, Netherlands, (Apr. 13-16, 2014), 14 pgs.

* cited by examiner

| | | subject: | Trusted task A | Trusted task B | Trusted task C | Trusted task D | Trusted task E | OS |
|---|---|---|---|---|---|---|---|---|
| 700 → | object | | | | | | | |
| 710 PROM/Flash | Tr. task A executable | entry code | rx<br>rx | rx<br>r | rx<br>r | rx<br>r | rx<br>r | rx<br>r |
| | Tr. task B executable | entry code | rx<br>rw | rx<br>rx | rx<br>r | rx<br>r | rx<br>r | rx<br>r |
| | Tr. task C executable | entry code | rx<br>rw | rx<br>r | rx<br>rx | rx<br>r | rx<br>r | rx<br>r |
| | Tr. task D executable | entry code | rx<br>r | rx<br>r | rx<br>r | rx<br>rx | rx<br>r | rx<br>r |
| | Tr. task E executable | entry code | rx<br>r | rx<br>r | rx<br>r | rx<br>r | rx<br>rx | rx<br>r |
| | OS executable | entry code | rx<br>r | rx<br>r | rx<br>r | rx<br>r | rx<br>r | rx<br>rx |
| 720 SRAM/DRAM | Tr. task A work space | data stack | rw<br>rw | -<br>- | -<br>- | -<br>- | -<br>- | -<br>- |
| | Tr. task B work space | data stack | rw<br>r | rw<br>rw | -<br>- | -<br>- | -<br>- | -<br>- |
| | Tr. task C work space | data stack | rw<br>r | -<br>- | rw<br>rw | -<br>- | -<br>- | -<br>- |
| | Tr. task D work space | data stack | -<br>- | -<br>- | -<br>- | rw<br>rw | -<br>- | -<br>- |
| | Tr. task E work space | data stack | -<br>- | -<br>- | -<br>- | -<br>- | rw<br>rw | -<br>- |
| | OS work space | data stack | -<br>- | -<br>- | -<br>- | -<br>- | -<br>- | rw<br>rw |
| 730 peripherals | MPU | RPR 1 | r | r | r | r | r | r |
| | | RPR 2 | rw | r | r | r | r | r |
| | | RPR 3 | rw | r | r | r | r | r |
| | | RPR 4 | r | r | r | r | r | r |
| | | RPR 5 | r | r | r | r | r | r |
| | | RPR 6 | r | r | r | r | r | r |
| | Timer | period handler (ISR) | r<br>r | r<br>r | r<br>r | r<br>r | r<br>r | rw<br>rw |
| | ⋮ | | | | | | | |

FIG. 7

US 10,565,132 B2

DYNAMIC CONFIGURATION AND PERIPHERAL ACCESS IN A PROCESSOR

FIELD OF THE INVENTION

The present disclosure relates in general to computer processors and in particular to the security of software in embedded systems.

BACKGROUND

Small processing units are becoming more common in current technologies. Portable electronics, automotive devices, toys, and even household appliances require the use of internal computing units for standard operation. Computer systems in these devices often provide some dedicated functionality that is tailored to the device. For example, a microcontroller in a thermostat may be adapted to monitor and regulate a home heating and cooling, and may also support communications to report status or to receive instructions from a homeowner.

Microcontrollers other controller circuits deployed in such devices may be called embedded systems. Many embedded systems are designed for widespread deployment in independent systems, which may allow benefits of low power consumption and/or low cost manufacture. Many embedded systems include some communications capabilities, to support interaction and/or upgrades.

The expanding use of embedded systems increases the need to include security features to may be helpful to protect these systems against spurious, malicious, or otherwise improper operation.

BRIEF DESCRIPTION OF THE DRAWINGS

The benefits, features, and advantages of the present disclosure will become better understood with regard to the following description, and accompanying drawings.

FIG. 7 illustrates an example of a permission table 700 in which a trusted task is permitted to make modifications to other trusted tasks.

DETAILED DESCRIPTION

A variety of approaches are contemplated for assisting in the protection of embedded systems and other processing systems. In various implementations, an embedded system may be designed to implement a trusted computing base—a set of hardware and software components that may provide security in assuring the execution of a task without improper interference. Tasks that are designed and believed to implement a security mechanism supported by the trusted computing base are trusted tasks. In various implementations, these tasks or the executable code that implements them on a suitable hardware platform with execution-aware memory protection, may be termed as trusted tasks or trusted programs.

Figure 1:
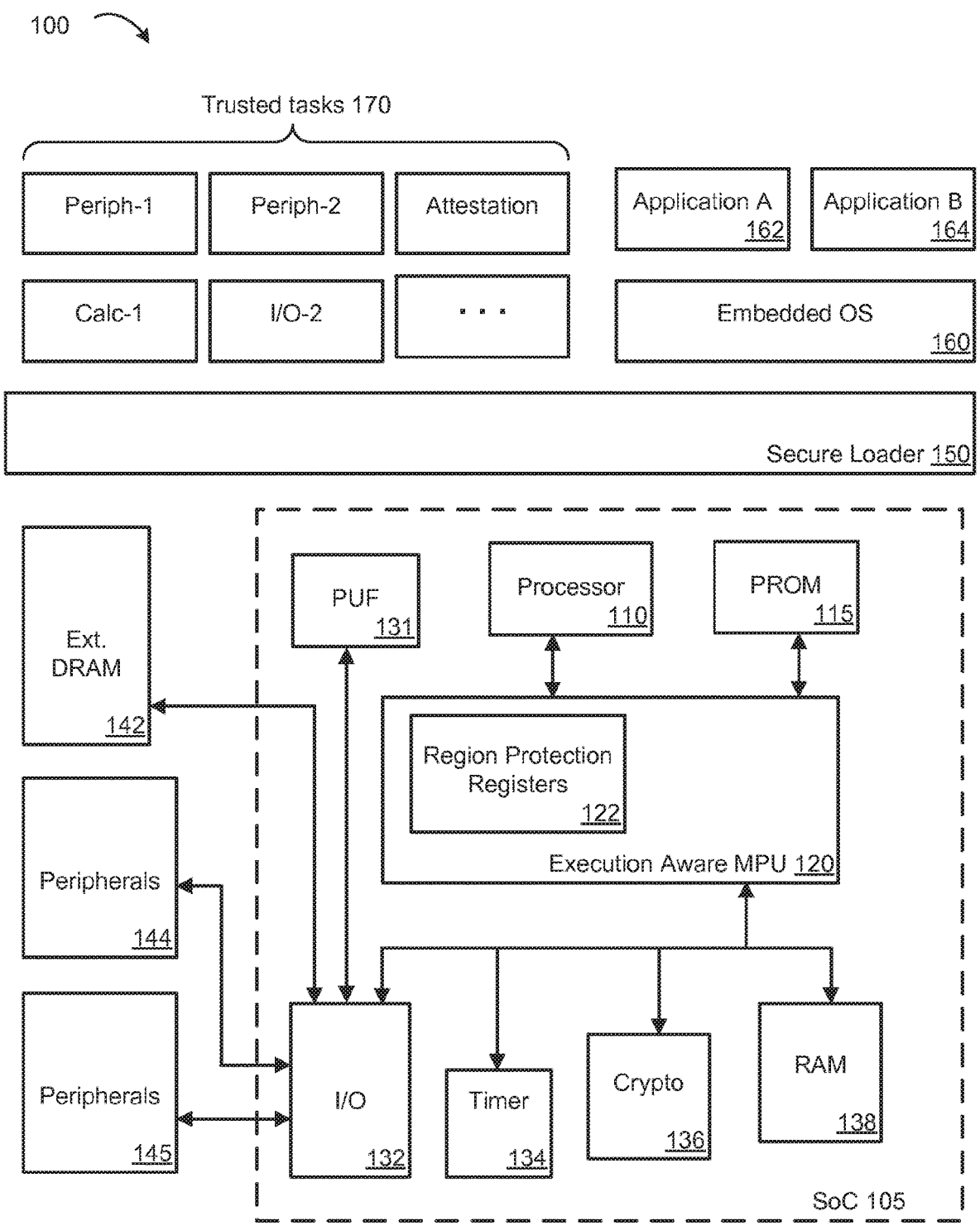
FIG. 1 shows one example of a system 100 configured to support execution of trusted tasks.

FIG. 1 shows one example of a system 100 configured to support execution of trusted tasks. In this implementation, system 100 includes a processor 110 coupled to an execution-aware memory protection unit (MPU) 120. MPU 120 enforces access control on all memory accesses, including regular memory as well as memory-mapped device I/O (MMIO). MPU 120 includes, in this example, internal region protection registers (RPRs) 122 that may be used to store permissions or rules for regulating access to resources such as regions of memory or MMIO-mapped hardware components. MPU 120 is execution-aware in the sense that it can regulate memory accesses based on the identity of the executable that requests a memory access (the subject of an access request), as well as on the memory address(es) that are to be accessed (the object of the access request). In various implementations, MPU considers the address of the currently executing instruction when validating a particular data or code access. In this example, system 100 also includes a physical unclonable function unit (PUF) 131, a programmable read-only memory (PROM) 115, a random access memory (RAM) 138, a cryptography module 136 such as a cryptographic accelerator, a timer 134, and an input/output (I/O) interface 132. In this example, these elements 110, 115, 120, 131, 132, 134, 136, and 138 are packaged in a system-on-a-chip (SoC) 105. The SoC architecture may be configured so that communication among the internal elements is secure or resistant to eavesdropping, tampering, or other attack. System 100 is also shown as having peripheral elements 144 and 145 and an external dynamic RAM (DRAM) memory 142, which are external to SoC 105. Peripherals 144, 145 and external DRAM 142 communicate with the SoC elements through I/O interface 132. Since these elements are external to SoC 105, programmers and other designers and may make security assumptions about the communications between these elements 142, 144, 145 and the on-SoC elements that are different from security assumptions about communications directly between the on-SoC elements. For example, a designer may assume that communications between external DRAM 142 and I/O interface 132 are more susceptible to attack than communications between RAM 138 and MPU 120.

In the example of FIG. 1, MPU 120 serves as a gatekeeper for communication with processor 110: all communication between processor 110 and other elements is passed through MPU 120 or otherwise regulated by MPU 120. In other implementations, processor 110 may be able to partly or fully communicate with one or more other on-chip components.

Various software elements may be included in system 100. A secure loader 150 is configured to verify and load software into RAM 138. Secure loader 150 may itself be a software component that is loaded in a secure manner. For example, SoC 105 may be configured to retrieve secure loader 150 from PROM 115 immediately or shortly following a power-on or reset. Instead, or in addition, SoC 105 may be configured to check a hash or other fingerprint of secure loader 150 prior to its execution on processor 110. In various configurations, secure loader 105 may be a combination of software and hardware, with instructions dependent on a secure hardware component (such as cryptography module 136) in SoC 105. In various implementations, secure loader 150 is active only during an initialization following a power-on or reset operation.

In various implementations of system 100, secure loader 150 may be configured to allow or deny the loading of software components into RAM 138, and/or allow or deny access by software components to various hardware or software resources during an initialization procedure. The decision to allow or deny loading or access may be based on factors such as source (for example, in various implementations, any module loaded from PROM 115 can be executed), fingerprint (for example, in various implementations, any program whose hash is listed in an access list in PROM 115 can be executed), or a certificate (e.g., any program that is digitally signed with an acceptable certificate in PROM 115 can be executed).

The software components that are authenticated for execution by secure loader 150 can include an embedded operating system (OS) 160, various applications 162, 164 that rely on embedded OS 160, and one or more trusted programs 170. Trusted programs 170 may be configured to operate independently of embedded OS 160. In the illustrated example, trusted programs 170 can include programs for controlling or responding to peripheral elements (e.g., a biometric sensor, a printer, a microphone, a speaker, a throttle, or other I/O components, sensors, actuators, or devices), programs for various I/O tasks, security programs, attestation programs, various calculation modules, communications programs, communication support protocols, or other programs, or combinations thereof.

In various implementations, secure loader 150 is configured to program MPU 120 during an initialization procedure to protect various memory regions against unauthorized access. These regions may include (a) memory regions that MPU 120 relies upon and (b) memory regions that trusted tasks 170 rely upon. In various implementations, this interaction between secure loader 150 and MPU 120 can support measured launch procedures without additional dedicated hardware support, or with support from hardware accelerators such as a signature verification engine (e.g. in cryptography module 136).

MPU 120 can include internal registers such as RPRs 122 or other memory to record information about permissions, including privileges or restrictions, that regulate access to various memory locations that may be accessed by processor 110. These regulations may be stored, for example, in a permission table or other data structure used by MPU 120.

Figure 2:
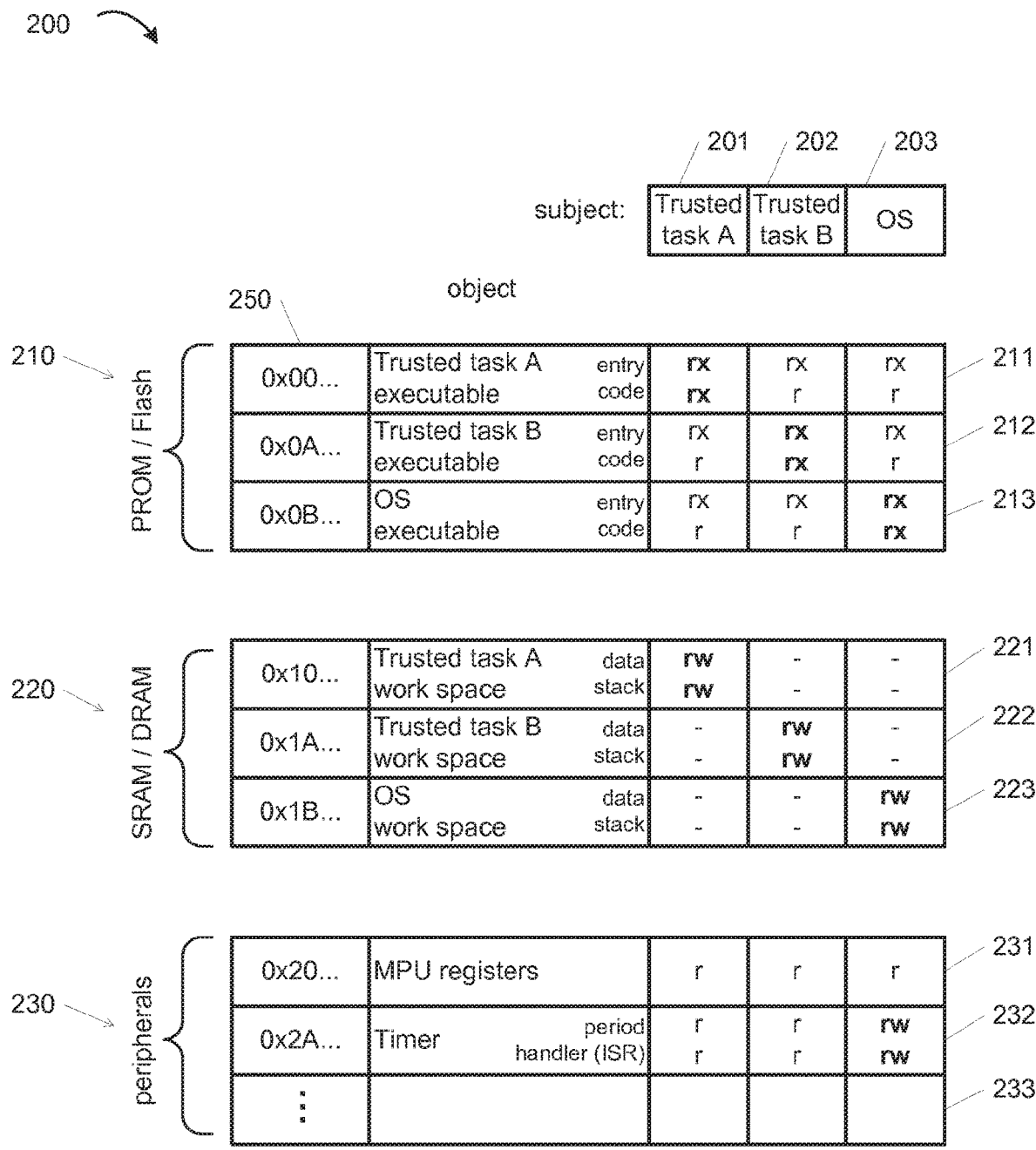
FIG. 2 illustrates an example of a permission table 200.

FIG. 2 illustrates an example of a permission table 200. Permission table 200 may be programmed into an execution-aware MPU (e.g., MPU 120 from FIG. 1) during a power-on, reset, or other initialization procedure. A secure loader module (e.g., secure loader 150) may be configured to look up and validate permissions to be stored in permission table 200. Only then does the secure loader continue to load and execute untrusted software (e.g., embedded operating system 160). The secure loader may configure the hardware memory protection and/or may initialize a chain of trust for remote attestation and trusted execution before delegating control to actual runtime code, such as an untrusted OS. In various implementations, the secure loader is activated following a power-on or reset operation and terminates following the initialization of permission table 200.

In various implementations, the information in permission table 200 is stored in region protection registers (e.g., RPRs 122) in the MPU. In the example of FIG. 2, permission table 200 is a write-protected table in on-chip memory that holds protection permissions for various code and data regions. The table includes permissions for accessing various regions of on-chip memory. In various implementations, external DRAM (e.g. memory 142 from FIG. 1) is not typically used for confidential trusted task data, since a designer may have a higher confidence in internal on-chip memory for attack resistance. External DRAM or other extended bulk memory may be used to support a larger body of code, such as untrusted routines, or an untrusted OS and applications stack, or public code and data requiring only integrity protection.

Permission table 200 includes permissions that support execution-aware memory protection. The permissions are based not only on the identity of memory to be accessed (the object of an access in FIG. 2), but also on the identity of the executing software or process or thread that is requesting the access (the subject of the access request in FIG. 2).

For example, permission table 200 may be used by an execution-aware MPU (e.g., MPU 120 from FIG. 1). The execution-aware MPU may regulate read accesses and/or write access for different processor privilege levels when a processor requests access to various memory regions. For code execute permissions, addresses generated by a processor's instruction fetch unit may be checked against various programmed access control rules. For data read/write permissions, data addresses generated by the instruction execute unit may be checked. In addition to these checks on the requested addresses, an MPU may be configured to link code regions to data regions, so that the requested data regions are evaluated in the context of the requesting code regions. In addition to validating the requested address from an instruction execute unit, the requesting address of an instruction being executed may also be considered. Thus, in various implementations, an execution-aware MPU not only validates data accesses (object, read/write/execute) but additionally considers an indicator such as the currently active instruction pointer (curr_IP) as the subject performing the access. In various implementations, an execution-aware MPU can be programmed to autonomously enforce a fine-grained access control based on individual executing code regions. Additional information on providing execution-aware memory protection is available in U.S. application Ser. No. 13/952,849 filed on Jul. 29, 2013, titled "Execution-Aware Memory Protection," and naming Patrick Koeberl and Steffen Schulz as inventors; and in Patrick Koeberl, Steffen Schulz, Ahmad-Reza Sadeghi, Vijay Varadharajan, "TrustLite: A Security Architecture for Tiny Embedded Devices," proceedings of the Association for Computing Machinery, *EuroSys* '14, Apr. 13-16, 2014, Amsterdam, 14 pages (2014).

In various implementations, execution-aware memory protection may enable strong isolation of software modules at low cost. Some implementations of low-cost memory protection assume a trusted operating system (OS) isolates tasks at runtime. Such implementations may cause the OS to be a single point of failure. Some isolating systems are limited to load-time configuration of trusted modules, which may prevent dynamic launch and update of trusted modules during runtime.

Execution-aware memory protection systems may be set up to isolate multiple software/data-based trusted modules, such as trusted tasks, so that they execute independently of the OS or other runtime services. In various implementations, execution-aware memory protection unit MPU can use the permissions in permission table 200 so that access to on-chip elements (e.g., elements 132, 134, 136, and/or 138) and/or external peripherals (e.g. peripherals 144 and/or 145) is securely restricted to various isolated software modules, such as trusted tasks 170.

In the example of FIG. 2, permission table 200 includes permission data arranged in three columns 201, 202, 203, which correspond to three software elements that may be executed by a processor (e.g., processor 110). In this illustration, the three subject software elements that may be executed—and which therefore may be expected to request access to memory locations—are designated trusted task A (201), trusted task B (202), and Operating System ("OS," 203). Each column shows the access permissions that are available to the corresponding software element.

Permission table 200 is also depicted with nine rows 211, 212, 213, 221, 222, 223, 231, 232, 233, each corresponding to object addresses of a protected section of memory or to an MMIO device port. At each intersection of a row and a column, the table stores the type of access permission that is available to the object addresses (row) when requested by the subject software elements (column).

Rows 211, 212, 213 in FIG. 2 make up a section 210 that specify permissions for access to addresses in a PROM or flash memory (e.g., PROM 115) that holds the executable code for the three software elements. In this example, the rows in section 210 correspond to the columns in permission table 200. Row 211 includes permissions for accessing the memory where code for trusted task A is held; row 212 includes permissions for accessing the memory where code for trusted task B is held, and row 213 includes permissions for accessing the memory where code for the OS is held. In this example, section 210 has a diagonal relationship between the subject software elements and the access that is permitted to the object addresses that hold the code for those software elements.

For example, consider the intersection of column 201 and row 211. This is an on-diagonal element: it indicates the permission that is to be granted when (1) an instruction from trusted task A is being executed by a processor (so that trusted task A is the subject) and causes the processor to request access to memory that holds code for trusted task A (so that the code for trusted task A is the object). In this situation, the intersection of column 201 and row 211 indicates that the processor is allowed to access the requested memory. Permission table 200 shows that this access is available as both a read permission and as an execute permission, and is available both for entry into the memory that holds trusted task A (e.g., for trusted task A to recursively call itself) and for loading the instructions of trusted task A (e.g., for trusted task A to retrieve instructions for further processing).

Similarly, trusted task B is allowed to enter and load the memory locations that store the instructions that make up trusted task B (intersection of column 202 and row 212). And the OS is allowed to enter and load the memory locations that store the instructions that make up the OS (intersection of column 203 and row 213).

In contrast, the example of section 210 shows that there are some restrictions in the off-diagonal table entries. Consider the intersection of column 201 and row 212. This is an off-diagonal element: it indicates the permission that is to be granted when (1) trusted task A is being executed by a processor (so that trusted task A is the subject) and causes the processor to request access to memory that holds code for trusted task B (so that the code for trusted task B is the object). In this situation, the intersection of column 201 and row 212 indicates that the processor would be allowed to access the requested memory, but with a limitation. This access is available as both a read permission and as an execute permission for entry into trusted task B (e.g., for trusted task A to pass control to a new instance of trusted task B), and is available as a read permission for reading the instructions of trusted task B. However, the example of permission table 200 shows that the processor would be denied execute permission if, while executing trusted task A, it were to request execute permission of an instruction from trusted task B. This denial reflects a security decision that such a request could indicate a spurious, malicious, or otherwise improper operation.

The other entries in section 210 further indicate this security decision. Each of the three software elements in this example (columns 201, 202, 203) are permitted to call the other software elements (rows 211, 212, 213). But none of the three software elements are themselves permitted to execute code from the other software elements. In some sense, the security decision shown in section 210 thus protects each of the three software elements from the other two.

A similar protection is illustrated in FIG. 2 for access to memory locations in a volatile memory used by the software elements. Rows 221, 222, 223 make up a section 220 that specifies permissions for access to addresses in a SRAM or DRAM module (e.g., RAM 138). This section includes three rows, which hold permissions for accessing memory locations that hold data and stack information for the three software elements. In this example, the rows in section 220 again correspond to the columns in permission table 200. Row 221 includes permissions for accessing the memory used by trusted task A; row 222 includes permissions for accessing the memory used by trusted task B, and row 223 includes permissions for accessing the memory used by the OS. In this example, section 220 has a diagonal relationship between the subject software elements and the access that is permitted to the object addresses used by those software elements: each software element is permitted to read and write to the data and stack locations assigned to that software element, and is denied any access to the data or stack locations assigned to the other software elements.

The rows in sections 210 and 220 are accessed based on the address to which the processor seeks access. Each row in permission table 200 includes information on the object address ranges (column 250) that are to be protected by that row.

Consider an example situation where the processor is executing trusted task A (the subject software element). In the course of that execution, the processor attempts to perform a read on a memory location, say 0x1A30 (the object address). The MPU will first look up the row in permission table 200 that corresponds to that memory location. In the example of FIG. 2, column 250 indicates that row 222 holds the permission information that protects this address. As discussed above, row 222 includes permissions for accessing the memory used by trusted task B. Column 201 of that row indicates that access to this memory should be denied if requested by the processor while the processor is executing trusted task A. Accordingly, in this example situation, the processor would be denied access to read the memory location.

FIG. 2 also illustrates protection for regulating access to resources that may be used by the software elements. Rows 231, 232, 233 make up a section 230 that specify permissions for access to resources other than memory storage. Row 231 includes permissions for accessing the registers in a memory protection unit (e.g., MPU 122) that store permission table 200 itself. Row 232 includes permissions for accessing a timer (e.g., timer 134). Row 233 indicates that section 230 can include additional rows for indicating permissions for peripherals or other resources (e.g., elements 131, 132, 136, 142, 144, 145).

As with the rows for memory ranges discussed above, the rows in section 230 are also indexed by address ranges. This indexing is facilitated by the use of memory-mapped device I/O (MMIO) access for the MPU, the timer, and other resources.

Row 231 allows all three software elements to read the MPU registers, which hold table 200. In this example, none of the three software elements is permitted to write (or execute) the MPU registers. This restriction prevents an improper operation from revising the permissions in table 200.

Row 232 also allows all three software elements to read the period of the timer and the interrupt handler (e.g., an interrupt service register) of the timer. However, only the operating system (column 203 of row 232) is allowed to write these parameters for the timer. Thus, row 232 has allocated control of the timer to the operating system.

Returning to row 231, it can be appreciated that neither trusted task A, nor trusted task B, nor the operating system are allowed to configure the permissions in table 200, since none of these software elements has write access to the MPU registers. Thus, permission table 200 needs to be loaded into the registers separately from (e.g., prior to) execution of these software elements. For example, this loading may be hard-wired into MPU as a read-only memory (ROM) component, or may be configured following manufacture as a write-once memory component, or installed as part of an isolated power-on operation or reset operation (e.g., using secure loader 150). However, no re-configuration of permission table 200 may be performed during runtime by any of the three software elements in the example of FIG. 2.

Figure 3:
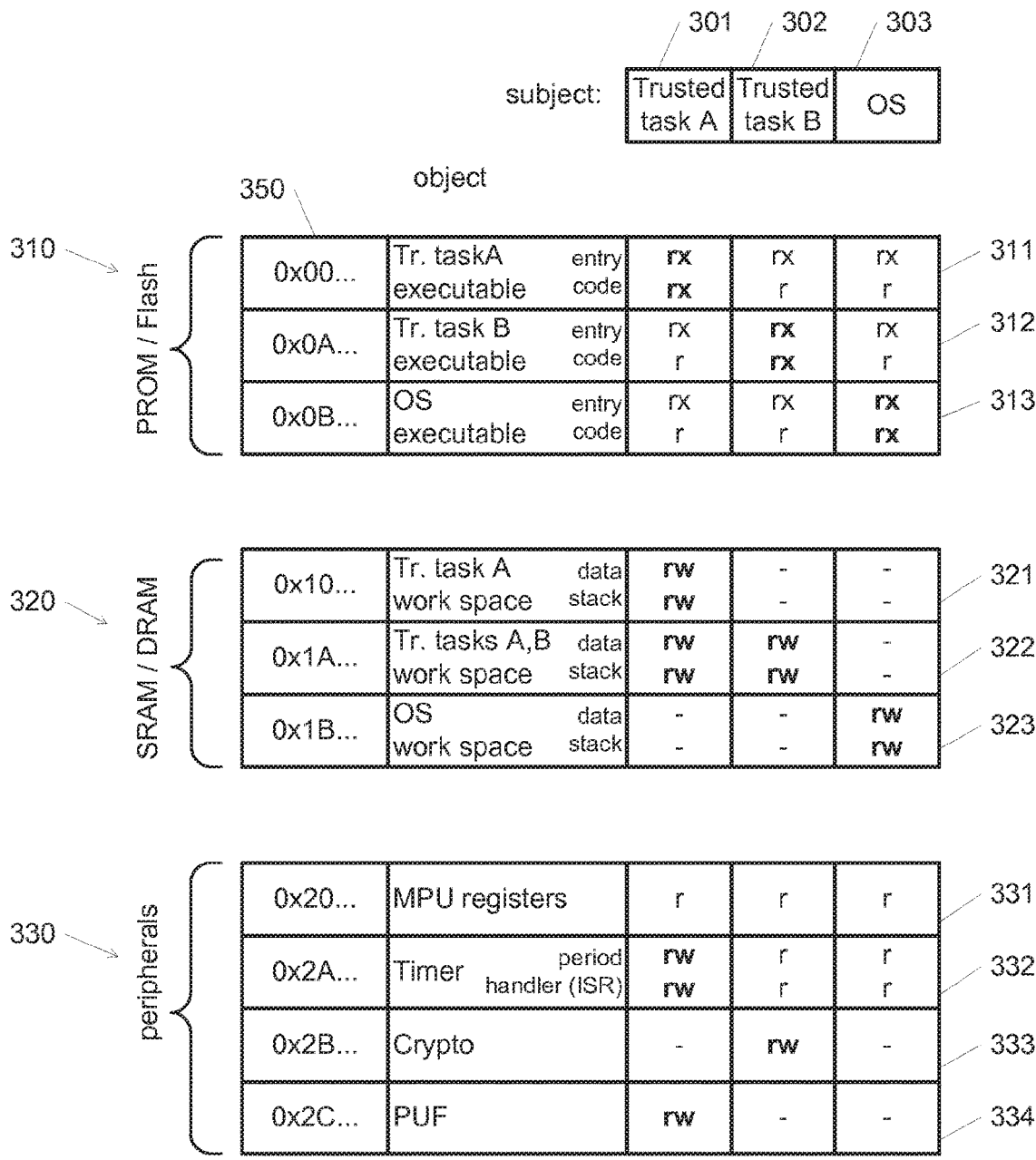
FIG. 3 illustrates an example of a permission table 300 that may be used to implement shared memory or device drivers.

FIG. 3 illustrates an example of a permission table 300 that may be used to implement shared memory or device drivers. As discussed above, a permission table may be programmed into an execution-aware MPU during an initialization procedure. In the example of FIG. 3, permission table 300 includes permission data arranged (similarly to the example presented in FIG. 2) in three columns 301, 302, 303, corresponding to three software elements, designated trusted task A (301), trusted task B (302), and Operating System ("OS," 303). Each column shows the access permissions that are available to the corresponding software element. The rows in permission table 300 are indexed by address ranges, shown in column 350. Permission table 300 includes three sections 310, 320, 330.

Rows 311, 312, 313 in FIG. 3 make up section 310, which specifies permissions for access to addresses in a PROM or flash memory (e.g., PROM 115) that holds the executable code for the three software elements. In this example, section 310 has a diagonal relationship between the subject software elements and the access that is permitted to the object addresses that hold the code for those software elements. This 1:1 relationship between subject and object in section 310 provides that none of the three software elements are permitted to directly execute code from the other software elements. As discussed above with regard to FIG. 2, this arrangement implements a security decision that provides some protection to each of the three software elements from the other two.

A similar protection is provided by the almost-diagonal arrangement in section 320 (rows 321, 322, 323). Section 320 specifies the permissions for access to memory locations in a volatile memory (e.g., RAM 138) that is used by the software elements. Each software element is permitted to read and write to the data and stack locations assigned to that software element. Two of the software elements, trusted task B and the OS, are denied any access to the data or stack locations that are assigned to the other two software elements (columns 302 and 303), as was the case in the example of FIG. 2.

However, in the example of FIG. 3, section 320 of the permission table also includes off-diagonal permissions. Trusted task A has been granted permission to read and write into the memory space that is also used by trusted task B, as can be seen in row 322. Thus, this section of memory is a combined-access memory space, shared by trusted task A and trusted task B. This arrangement contrasts with the situation discussed above with regard to FIG. 2. The arrangement in FIG. 3 provides a little less security isolation between trusted task A and trusted task B. But this reduction in security may be acceptable in various situations such as, for example, if trusted tasks A and B share a common source history or are accepted to have equivalent providences or trustworthiness.

In various situations, a possible benefit of the arrangement in FIG. 3 is that trusted tasks A and B can communicate with each other by simply writing and reading inter-process information in the shared memory space. This shared memory space may also provide security benefits in that the shared memory is protected from other processes (such as the OS, in this example) by virtue of the permissions stored in permission table 300, which are enforced by the execution-aware MPU (e.g., MPU 120 from FIG. 1).

In the example of FIG. 3, trusted tasks A and B are both associated with one of the data regions (described by a single address range) in an SRAM or DRAM module. In FIG. 2, section 220 presented a one-to-one (1:1) relationship between software elements and regions in volatile memory. In FIG. 3, however, section 320 shows that one of the volatile memory regions has a 2:1 relationship: two software elements share the memory region in row 322.

It will be appreciated that this arrangement can be expanded to support a many-to-many (N:M) relationship between software elements and protected memory regions. Various trusted tasks may each be associated with one or more address spaces (including address spaces for volatile memory, other memory, and MMIO addresses for other devices), and various combinations of trusted tasks may share one or more of these data regions. Moreover, the individual data regions may address different types of memory, e.g., ROM, flash, optical, magnetic, or other types, and/or with different semantics on read and write access.

Rows 331, 332, 333, 334 make up a section 330 of permission table 300 that specifies permissions for access to resources other than memory storage. Row 331 includes permissions for accessing the registers in a memory protection unit (e.g., MPU 122) that store permission table 300 itself. Row 332 includes permissions for accessing a timer (e.g., timer 134). Row 333 includes permissions for accessing a cryptography unit (e.g., cryptography module 136). Row 334 includes permissions for accessing a physically unclonable function (e.g., PUF 131). This indexing is facilitated by the use of memory-mapped device I/O (MMIO) access for the MPU, the timer, the cryptography unit, the PUF, and other resources.

In this example, row 331 allows all three software elements to read the MPU registers, which hold table 300. None of the three software elements is permitted to write (or execute) the MPU registers in this example. This restriction helps prevent an improper operation from revising the permissions in table 300.

Row 332 allows all three software elements to read the period of the timer and the interrupt handler (e.g., an interrupt service register) of the timer. However, only trusted task A is allowed to write these parameters for the timer (column 301 of row 332). Thus, row 332 has allocated control of the timer to a single trusted task, trusted task A. In this sense, trusted task A can be, or can include, a secured driver module for the timer.

Similarly, row 333 has allocated control of the cryptography unit only to trusted task B. Thus, other software elements may access the cryptography unit only through trusted task B. In this sense, trusted task B can be, or can include, a secured driver module for the cryptography unit.

Figure 4:
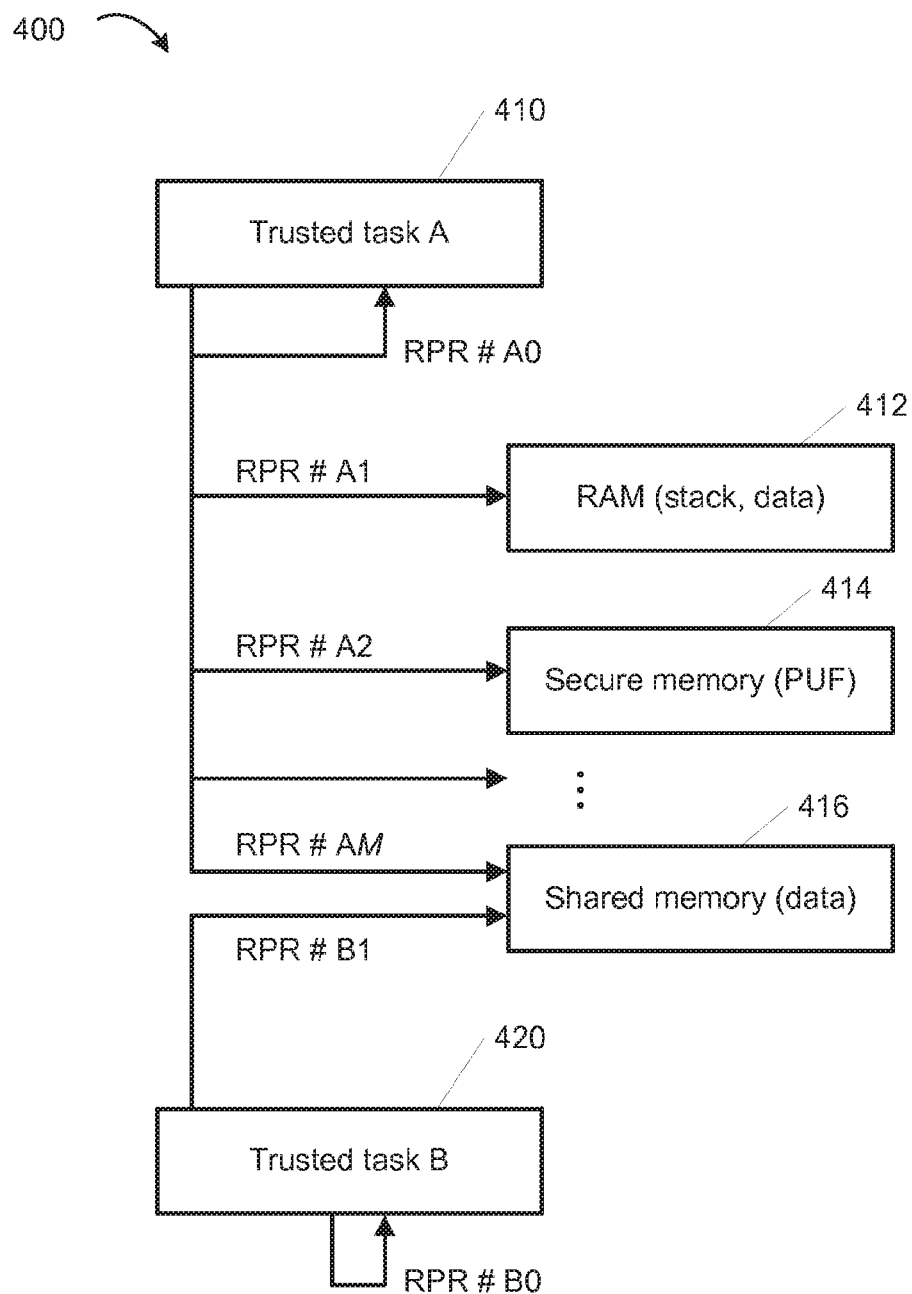
FIG. 4 illustrates an example in which an N:M execution-aware MPU has been configured to establish trusted tasks with different memory regions.

FIG. 4 illustrates an example in which an N:M execution-aware MPU has been configured to establish trusted tasks with different memory regions. In this example, a block diagram 400 shows permissions that have been granted to two software elements by permissions stored in various region protection registers of an execution-aware MPU. Block diagram 400 illustrates that access has been granted to trusted task A by M+1 region protection registers, RPR# $A_0$, $A_1, \ldots, A_M$. At the top of the diagram, block 410 represents a memory region that holds the executable code for trusted task A. Region protection register # $A_0$ controls the permissions for accessing memory region 410. The returning arrow at block 410 indicates that RPR# $A_0$ allows the processor, when executing trusted task A, to access the executable code for trusted task A. The arrow to block 412 indicates that RPR# $A_1$ allows the processor, when executing trusted task A, to access a section of RAM that is assigned to trusted task A. The arrow to block 414 indicates that RPR# $A_2$ allows the processor, when executing trusted task A, to access MMIO addresses of a physically unclonable function (e.g., PUF 131 from FIG. 1). The arrow from block 410 to block 416 indicates that RPR# $A_M$ allows the processor, when executing trusted task A, to access a shared region of memory.

Block diagram 400 also illustrates that access has been granted to trusted task B by two region protection registers, RPR# $B_0$ and $B_1$. At the bottom of the diagram, block 420 represents a memory region that holds the executable code for trusted task B. Region protection register # $B_0$ controls the permissions for accessing memory region 420. The returning arrow at block 420 indicates that the RPR# $B_0$ allows the processor, when executing trusted task B, to access the executable code for trusted task B. The arrow from block 420 to block 416 indicates that RPR# $B_1$ allows the processor, when executing trusted task B, to access the same shared region of memory 416 that is available to trusted task A. (In various implementations, the region protection register # $B_1$ may be the same register as RPR# $A_M$.)

Thus, in the example of FIG. 4, the N:M access enabled by the region protection registers includes a 2:1 access to shared memory 416. Trusted task A and trusted task B each have protected access to various memory addresses. This access includes a protected sharing of one common resource, the shared memory 416, which is available to these two trusted tasks. If the region protection registers in this example are configured to hold data such as permission table 300 (from FIG. 3), then this 2:1 relationship may be created using the permissions such as those shown in row 322 of FIG. 3.

The memory region 412 may include, for example, RAM space for storing typical program data like stack and variables for trusted task A. The memory region 414 may include, for example, secure memory areas such as eFuses or a physical unclonable function (PUF). The memory region 416 may include, for example, shared program data and parameters for trusted tasks A and B, and/or memory locations for inter-process communications between these two trusted tasks.

Figure 5:
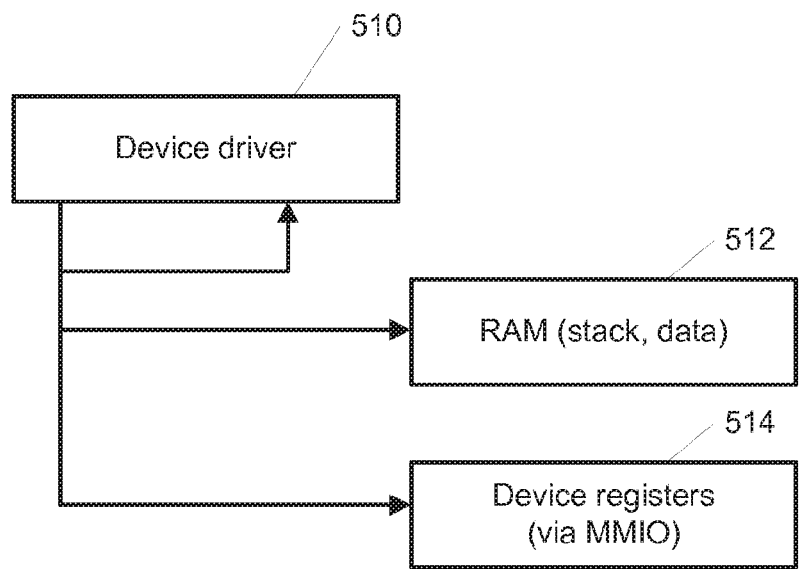
FIG. 5 illustrates an example in which N:M configurability makes use of MMIO access to construct a device driver from a trusted task.

FIG. 5 illustrates an example in which N:M configurability makes use of MMIO access to construct a device driver from a trusted task. If a trusted task is provided exclusive access to a peripheral's MMIO region using one or more additional RPRs in an execution-aware MPU, the trusted task may serve as a device driver that provides trusted access to the peripheral.

Block diagram 500 illustrates that access has been granted to a trusted task device driver 510 by various region protection registers in an execution-aware MPU. At the top of the diagram, block 510 represents a memory region that holds the executable code for the device driver. The returning arrow at block 510 indicates that region protection registers in the MPU have been set so that the MPU allows the processor, when executing the device driver, to access the executable code for the device driver. The arrow to block 512 indicates that the MPU allows the processor, when executing device driver, to access a section of RAM that is assigned to the device driver. The arrow to block 514 indicates that the MPU allows the processor, when executing the device driver, to access MMIO addresses of registers in a device such as a peripheral device. The peripheral device may be an on- or off-processor element such as element 131, 132, 134, 136, 144 and/or 145 from FIG. 1, for example.

In this example, the trusted task device driver in block 510 may provide OS-independent access limitations for the peripheral. Similarly, the device driver may provide hardware resources multiplexing for the peripheral. Moreover, the device driver may provide data protection for communications with the peripheral. Examples of devices drivers that may be implemented using trusted tasks in this manner include a secure keypad driver, a secure display driver, input-output drivers, communications drivers, and others. In various situations, it may be useful to share access to a peripheral's MMIO region among two or more trusted tasks. Similarly, it may be useful in some situations to partition a peripheral's MMIO region so that some portions of the MMIO region are accessible to a set of one or more trusted tasks and other portions are available to a different set of one or more trusted tasks.

Figure 6:
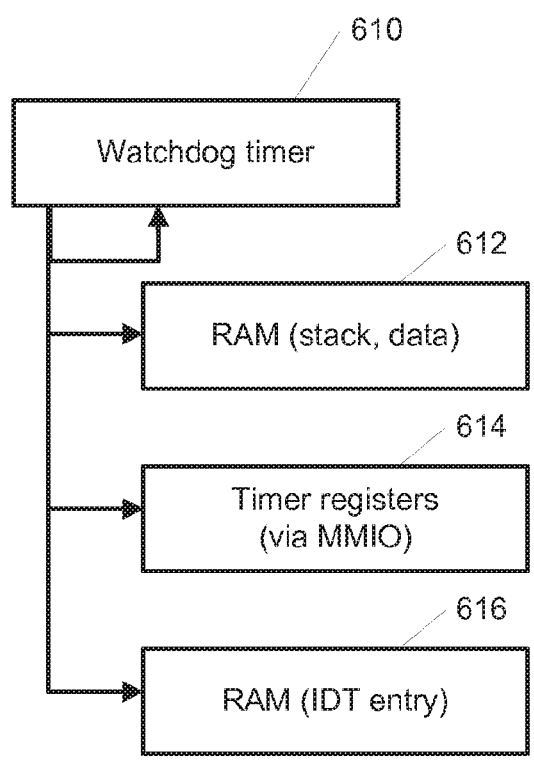
FIG. 6 illustrates an example in which N:M configurability makes use of MMIO access to construct a watchdog timer from a trusted task that is given exclusive access to a timer.

FIG. 6 illustrates an example in which N:M configurability makes use of MMIO access to construct a watchdog timer from a trusted task that is given exclusive access to a timer. An execution-aware MPU may be configured so that various software elements are given exclusive access to various data structures in memory. In one example, a watchdog timer service may be implemented by providing such access.

In various situations, watchdog timers protect a computer or embedded system from endless-loop situations and other software errors. A watchdog timer is usually implemented in hardware, and provides a countdown to mark elapsed time since the watchdog timer was reset. Various general software programs may be configured so that, when operating properly, they regularly restart the watchdog timer and prevent it from timing out. A hardware or software error may cause a program to enter an endless loop condition, or other undesired condition. This condition may be detected by the watchdog timer, which then does not receive the expected restart. The detection occurs when the watchdog actually times out. Upon timing out, the watchdog timer may initiate a corrective action through a hardware interrupt. The action to be taken on the hardware interrupt may be a reset, restart, or other corrective action, and may be defined by an entry in a hardware interrupt descriptor table (IDT).

In the example of FIG. 6, a trusted task is provided exclusive access to registers in a hardware timer module's MMIO region and to a data structure that describes operations following a hardware interrupt that may be triggered if and when the timer times out. Block diagram 600 in FIG. 6 illustrates an example in which access has been granted to a trusted task watchdog timer 610 by various region protection registers in an execution-aware MPU. Region protection registers in the MPU have been set so that a processor executing the watchdog timer has access to the executable code of the watchdog timer (in block 610), to RAM that is assigned to the watchdog timer (block 612), to MMIO-accessible registers in a timer device (block 614), and to a memory region that holds an entry of an interrupt descriptor table (IDT) (block 616). The IDT entry in block 616 may be a programmable data structure in main memory. Watchdog timer 610 configures the IDT entry to identify a corrective action that should be used by a processor in response to a timeout hardware interrupt.

Watchdog timers are usually implemented in hardware as a specialized service. The example shown in FIG. 6 may be used to flexibly control a general timer unit to provide a software implementation of a watchdog service. This implementation may be achieved, in various situations, without virtualization or other special processor modes. In various situations, the trusted task watchdog service implementation shown in FIG. 6 may provide a watchdog service that is isolated from other software modules by the protection of the MPU. The service may be configured so that it can revise the time-out duration, start the timer, stop the timer, and select the corrective action that should be taken in response to a timeout interrupt.

Because of the protection provided by the MPU, this implementation of a watchdog timer may be able to provide high assurance that the a hardware timer module (accessed by block 614) triggers in the desired intervals. This implementation also applies execution-aware MPU protection to the IDT entry, which may help ensure that that the processor invokes the proper response to a timeout interrupt.

FIG. 7 illustrates an example of a permission table 700 in which a trusted task is permitted to make modifications to other trusted tasks. In this example, an execution-aware MPU is provided with some flexibility to modify access permissions during runtime.

In the example of permission table 700, six columns indicate that permissions are stored in the table for access by six different software elements: trusted tasks A-E and an operating system. A first section 710 of the table specifies permissions for access to addresses in a PROM or flash memory (e.g., PROM 115) that holds the executable code for the six software elements. This section of FIG. 7 indicates which subject software elements are permitted to access the object addresses that hold the code for those software elements. Section 710 has a largely—but not completely—diagonal relationship between the subject software elements and the access that is permitted to the object addresses in which executable code for those software elements is stored. Each of the six software elements in this example (the columns for trusted tasks A-E and OS) is permitted to call the other software elements (the rows for trusted tasks A-E and OS in section 710). In contrast to the example of FIG. 3, the example of FIG. 7 also illustrates a condition in which section 710 has been modified so that trusted task A can write or revise code for two other software elements: trusted tasks B and C.

A similar type of permission is illustrated in FIG. 7 for access to memory locations that are used by the software elements. A section 720 specifies permissions for access to addresses in a SRAM or DRAM module (e.g., RAM 138). This section includes six rows, which hold permissions for accessing memory locations that hold data and stack information for the six software elements. In this example, section 720 has a largely—but not completely—diagonal relationship between the subject software elements and the access that is permitted to the object addresses used by those software elements. Each software element is permitted to read and write to the data and stack locations assigned to that software element. And most of the software elements-trusted tasks B-E and the OS—are denied any access to the data or stack locations assigned to the other software elements. However, in contrast to the example of FIG. 3, the example of FIG. 7 also illustrates a condition in which section 720 has been modified so that trusted task A can read and write the data locations assigned to two other software elements. As can be seen from column 1 of section 720, trusted task A is permitted to read and write the data workspace used by trusted tasks B and C.

Thus, in this example, the permissions in sections 710 and 720 have been adjusted so that trusted task A can make modifications during runtime to the code of trusted task B, the code of trusted task C, the data used by trusted task B, and/or the data used by trusted task C. There is therefore a 2:1 relationship between subject and object for access by software elements for the data space used by trusted task B; trusted tasks A and B share this memory space. Similarly, there is a 2:1 relationship between subject and object for access by software elements for the data space used by trusted task C; trusted tasks A and C share this memory space. This sharing shown in section 720 can facilitate secure inter-process communication between trusted tasks A and B and between trusted tasks A and C. In other examples (not shown), two or more trusted tasks may each have exclusive access to their own assigned memory regions, while sharing common access to an additional separate memory region.

Moreover, in the example of FIG. 7, there is some ability for a trusted task to modify access permissions of other trusted tasks. A third section 730 in FIG. 7 shows that all six software elements are permitted to read the MPU registers, which hold table 700. Most of the software elements (five out of the six) are forbidden to write the MPU registers. This restriction helps prevents an improper operation from revising the permissions in table 700 (as was the case in the example of FIG. 2).

However, section 730 also includes permissions that allow one of the software elements—trusted task A—to modify some portions of the MPU registers. In this example, the MPU registers are labeled as six separate region protection registers: RPR 1, RPR 2, RPR 3, RPR 4. RPR 5, and RPR 6. These six registers correspond, respectively, to permission rows for trusted tasks A-E and the OS in sections 710 and 720 of table 7.

In the example of FIG. 7, column 1 of section 730 shows that trusted task A can modify the permissions that regulate access to the code space and working memory space of trusted task B (RPR 2) and trusted task C (RPR 3). Thus, trusted task A has permission to edit permission table 700 during runtime in order to modify the permissions that grant access to the code and working memory spaces trusted tasks B and C. This ability to edit portions of permission table 700 may be used by trusted task A to temporarily (or permanently) revise sections 710 and/or 720 into the partly non-diagonal arrangements discussed above.

Section 730 also includes two final rows that illustrate access permissions for hardware components and other elements. For example, the permissions in section 730 allocate control of a timer to the operating system.

During operation, a processor and/or an execution-aware MPU would consult the rows in sections 710, 720, and 730 based on the address to which the processor seeks access. Each row in permission table 700 includes information on the object address ranges (not shown) that are to be protected by that row.

The permissions shown in the example of FIG. 7 illustrates logic that may be deployed in an execution-aware MPU with registers (RPRs) that define memory regions and access permissions, and which themselves are subject to access control via MMIO. This property may be used to deploy trusted tasks that can configure or reconfigure all or part of the region protection registers during runtime. Because of the restrictions imposed on them by the permissions table, such trusted tasks may be considered reliable without having to be executed in a privileged CPU mode. Such trusted tasks may also co-exist with other isolated trusted tasks on the same platform. This coexistence is supported by the observation that the trusted tasks have somewhat isolated trusted computing bases—they may use separate sections of memory and may use separate hardware components, as enforced by an MPU that applies permissions table 700.

Figure 8:
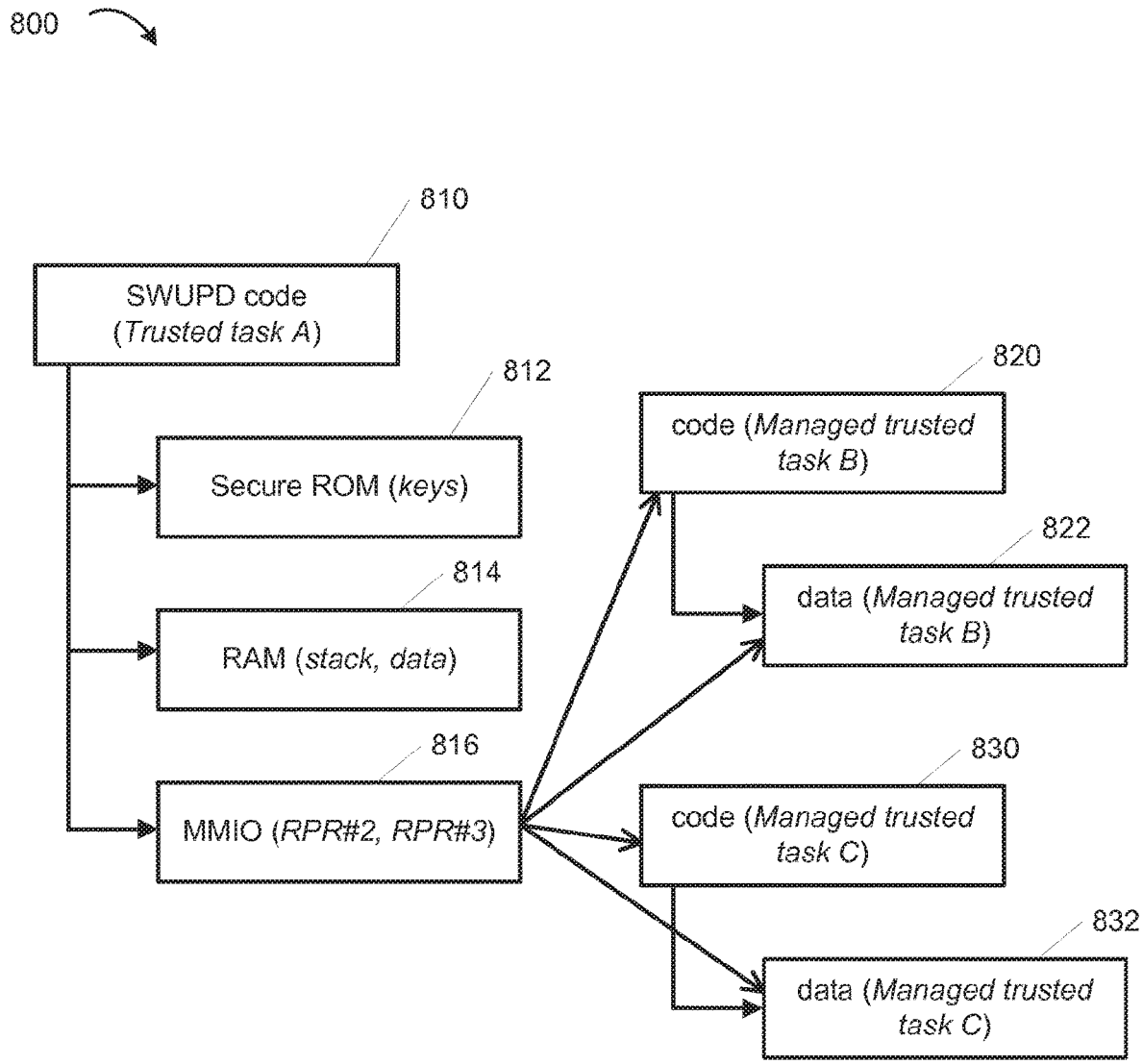
FIG. 8 shows an example of a management arrangement among software elements.

FIG. 8 shows an example of a management arrangement among software elements. This management arrangement may be implemented using an MPU that enables runtime reconfiguration. Block diagram 800 in FIG. 8 illustrates an example in which the regulations discussed above with regard to section 730 of FIG. 7 may be used to support a software update service (SWUPD) provided by trusted task A. The software update service may enable runtime software updates to be applied to other trusted tasks (trusted tasks B and C) without requiring a platform restart.

In block diagram 800, a trusted task A (810) has been given access to access authentication keys or other cryptographic keys in a secure ROM memory region 812, to a working memory space 814, and to region protection registers 816 that define permissions to other memory spaces. Those other memory spaces are memory regions that hold code for two other software elements, trusted task B (820) and trusted task C (830), along with the working spaces 822, 832 for those two trusted tasks.

In this example, trusted task A is given write access to the permissions settings (816) that are used to protect the two other trusted tasks. In this context, trusted tasks B and C can be considered as managed trusted tasks. Trusted task A can implement a network protocol to receive authenticated and authorized updates from remote parties. The authentication and secure communication may be supported by the keys in memory region 812. Trusted task A may then apply the updates to the managed trusted tasks B and/or C.

For example, trusted task A may communicate to managed trusted tasks B and C to stop execution and save their work. This communication can take place, for example, using the memory sharing described above with regard to section 720 of FIG. 7. Trusted task A may then modify the RPRs 816 of trusted tasks B and C to enable modification of the code of trusted tasks B and C (for example, by modifying the leftmost column of section 710 from FIG. 7 so that trusted task A can overwrite the code of trusted tasks B and C). Trusted task A may then perform the desired software update by writing into the code and data regions of trusted tasks B and C. Finally, if needed, trusted task A may re-apply a diagonal 1:1 protection for executable code in section 710 and for workspace data in section 720.

Figure 9:
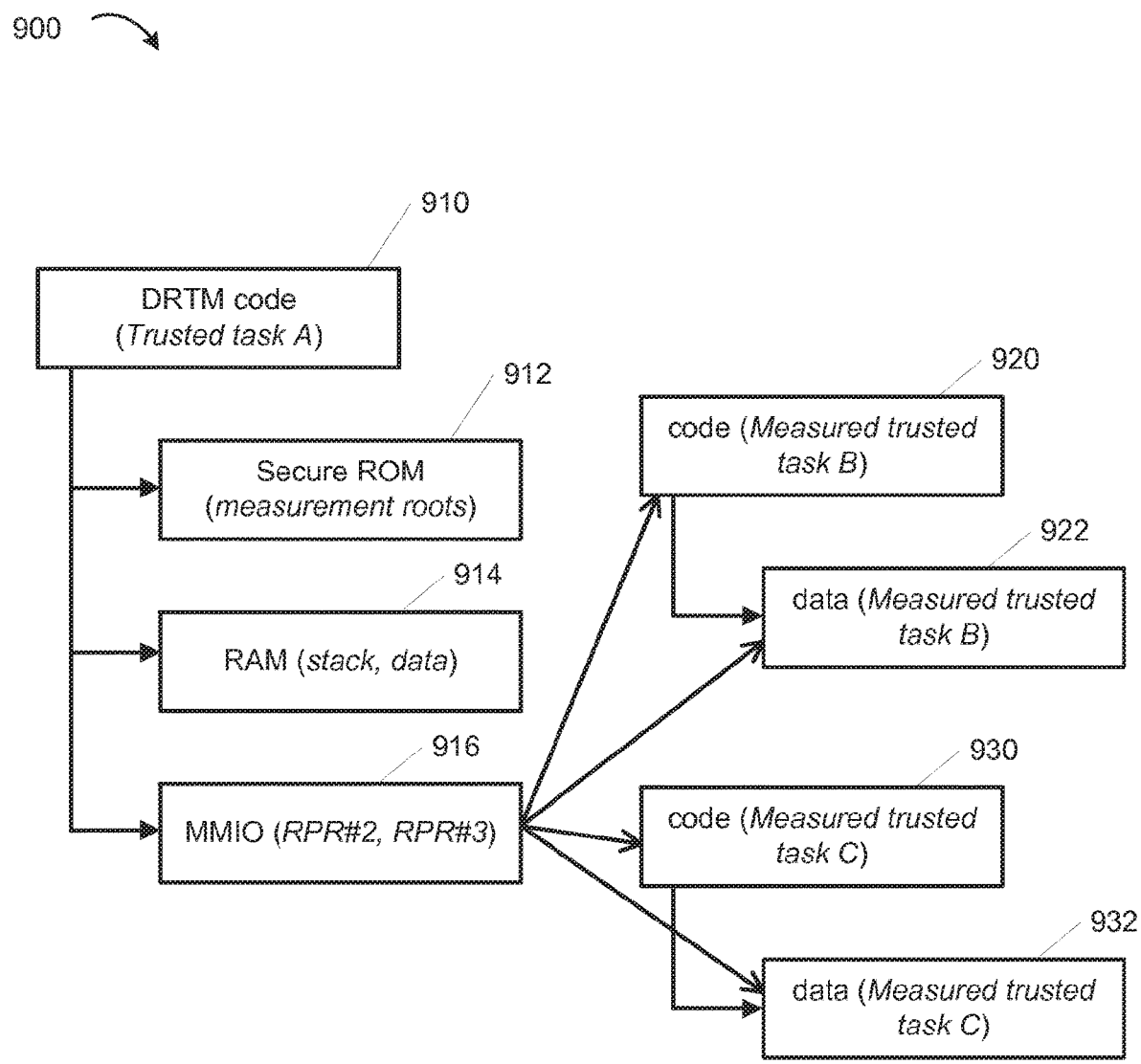
FIG. 9 shows an example of a dynamic root of trust for measurement (DRTM) service.

FIG. 9 shows an example of a dynamic root of trust for measurement (DRTM) service. This DRTM service may be implemented using an execution-aware MPU that enables runtime reconfiguration. In this example, the regulations presented in FIG. 7 may be used to start and stop certain services at runtime, in such a way that their correct initialization and provided inputs may be verified.

Block diagram 900 in FIG. 9 illustrates an example in which the regulations presented in section 730 of FIG. 7 may be used to support dynamic root of trust (DRTM) examinations by trusted task A. In block diagram 900, a trusted task A (910) has been given access to root signatures or hashes or other confirming information for trust management in a secure ROM memory region 912. Trusted task A 910 also has been given access to a working memory space 914, and to region protection registers 916 that define permissions to other memory spaces. Those other memory spaces are memory regions that hold code for two other software elements, trusted task B (920) and trusted task C (930), along with the working spaces 922, 932 for those two trusted tasks.

In this example, the DRTM trusted task A (910) is configured to perform a measured launch of trusted tasks B and C (920, 930). The measured launch confirms that trusted tasks B and C conform to expected descriptions, such as hashes of their code and/or their configuration parameters, and/or other signatures and/or other descriptive information. The confirmation may be supported by root information obtained from secure memory region 912. This confirmation may be performed before trusted tasks B or C are allowed to execute on a processor. In this context, trusted tasks B and C can be considered as measured trusted tasks. DRTM trusted task A may be provided with meta-data or other descriptive information about trusted tasks B and C, describing the permissions to be granted to those trusted tasks and the contents of each memory region to be allocated. DRTM trusted task A may furthermore implement a measurement facility and policy, describing which of the provided components of trusted tasks B and C to measure and how the measurements should be made. An example measurement policy may be to measure all meta-data, code regions and startup parameters using a cryptographic hash algorithm (or other checksum-type or signature calculation), producing outputs such as h(B) and/or h(C). Once the managed trusted tasks have been measured and confirmed, and their requested permissions have been allocated and initialized, the availability of the measured trusted tasks may be announced on a local platform. For example, an interprocess communication (IPC) name services may be used to announce the measured trusted tasks, or a local OS kernel may be informed of the existence of the measured trusted tasks. DRTM trusted task A may also be configured to report h(B) and/or h(C) to other local or remote entities using remote attestation protocols.

Various security applications use a CPU extension that is limited to associating a single code and data region. In various embodiments, an execution-aware MPU does not require CPU extensions and does not limit the number of code and data regions per trusted module. For example, a DRTM service may implement measurement and launch of trusted tasks at runtime without additional CPU extensions. In various implementations of a system, some trusted tasks (e.g., trusted service modules) may operate on other trusted tasks.

Some security applications use IP-dependent memory access control to limit access to a DRTM attestation key. In various embodiments, an execution-aware MPU design may be used to instantiate several simultaneously executing trusted tasks to provide DRTM or other services.

In some security applications, software domains or software enclaves may communicate securely with peripherals based on a certain level of hardware support, such as an ability to transmit encrypted data to graphics card buffers. In various embodiments, an execution-aware MPU design for low-end embedded devices with MMIO, secure peripherals access, DRTM and other platform services may be implemented based on a generic (execution-aware) MPU, without explicit HW logic for the particular type of attestation, DRTM or secure I/O algorithms and protocols. Various such implementations may offer smaller footprints on a chip surface and/or faster validation time.

In various implementations, a system on a chip may initially support a number of trusted tasks (execution-aware MPU regions) and I/O. Programmable execution-aware MPU and/or runtime MPU RPR re-configuration may then be used to add and/or update security infrastructure such as DRTM, attestation protocols, secure updates or secure audio/video and timers at a later time in form of programmable trusted tasks.

Figure 10:
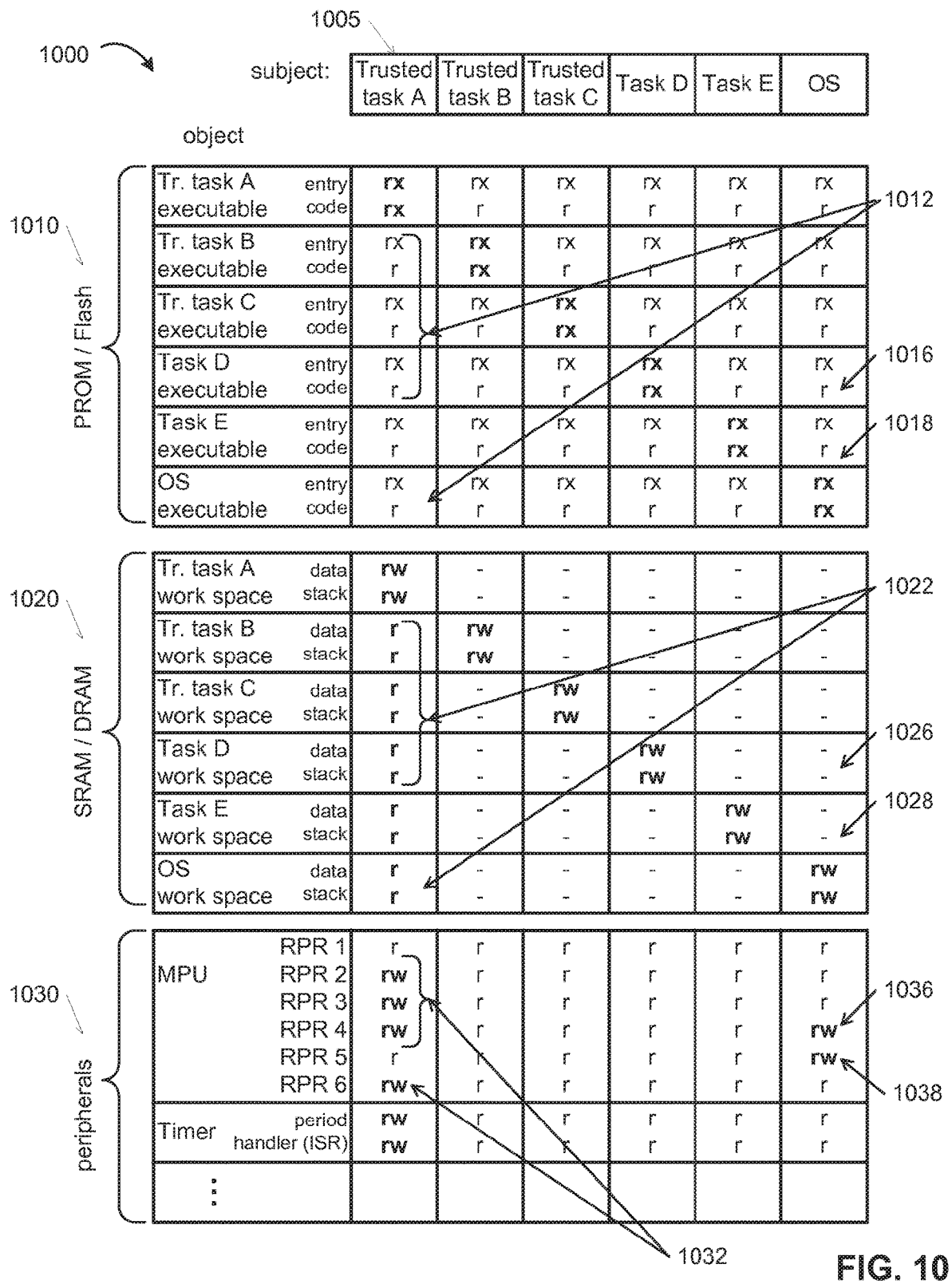
FIG. 10 illustrates an example of a permission table 1000 in which an operating-system is permitted to make limited modifications to the permission table.

FIG. 10 illustrates an example of a permission table 1000 in which an operating-system is permitted to make limited modifications to the permission table. Similarly to the arrangement described above with respect to FIG. 7, the example of permission table 1000 includes six columns. Each column indicates permissions stored in the table for access by a corresponding software element: trusted task A, trusted task B, trusted task C, task D, task E, and an operating system (OS).

A first section 1010 of the table specifies permissions for access to memory addresses where executable code is stored. In this example, the executables are stored in a PROM or flash memory (e.g., PROM 115) that holds the executable code for the six software elements. A second section 1020 specifies permissions for access to memory addresses where data used by the executables is stored. In this example, these data are stored in a SRAM or DRAM module (e.g., RAM 138). A third section 1030 specifies permissions for access to other resources. The rows labeled RPR 1-3 hold permissions for accessing memory regions used by trusted tasks A-C, respectively. The rows labeled RPR 4-5 hold permissions for accessing memory regions used by tasks D-E, respectively. Rows RPR 6 holds permissions for accessing memory regions used by the OS.

Section 1030 includes settings 1032 that provide trusted task A with permission to edit portions of permission table 1000 during runtime in order to modify the permissions that relate to four other software elements. These settings 1032 enable trusted task A to modify the settings in the permission table for access to trusted tasks B-C, to task D, and to the OS. For example, trusted task A can rewrite some or all of the permissions settings 1012 for trusted task A to access the executable memory space of those four other software elements. Similarly, trusted task A can rewrite some or all of the permissions settings 1022 for trusted task A to access the working memory space for those four other software elements. Thus, in this example, trusted task A can revise portions of permissions table 1000 in order for trusted task A to perform runtime modifications to those four other software elements.

For example, trusted task A may use its privileges (1032) to temporarily modify other permissions (1012, 1022) to modify code in those four other software elements, or to have shared access to the working space regions of those software elements. Thus, the example of FIG. 10 may be used in situations where trusted task A needs to temporarily facilitate secure inter-process communication between software elements, and may allow run-time installation or control or modification by trusted task A of the those four other software elements. This example of permissions may be used in various situations so that trusted task A can provide instances of the shared memory operations, device-driver applications, watchdog timer applications, software update support, and DRTM support discussed above with regard to FIGS. 4-6 and 8-9.

Further, the example of FIG. 10 allows the OS to in turn to modify tasks D and E. Settings 1036 in table 1000 enables the OS to modify the settings in the permission table for access to task D. Section 1030 also includes settings 1038 that enable the OS to modify the settings in the permission table for access to task E. These two settings allow the OS to revise four other settings: the permissions 1016 for the OS to access the executable memory space of task D; the permissions 1018 for the OS to access the executable memory space of task E; the permissions 1026 for the OS to access the working memory space for task D; and the permissions 1028 for the OS to access the working memory space for task E. Thus, in this example, the OS can revise portions of permissions table 1000 in order for the OS to perform runtime modifications to task D and/or task E. This configuration may be useful in situations where the system has been designed to accept a variety of operating systems, so that an appropriate operating system can be deployed as needed by trusted task A. In various situations, differing levels of trust may be ascribed to the OS. In some situations, an OS may be recognized as a trusted task on par with trusted tasks A-C; in other situations an OS may be recognized as having a lower level of trustworthiness. Moreover, in various implementations of a system, the trustworthiness designation of a "trusted task" may be applied to software elements, supported by appropriate execution-aware memory protection, that do not rely on the operating system and/or are not subject to control by the operating system. Similarly, software elements that rely on or are controllable by an operating system may be deemed as regular "tasks." Correspondingly, in various situations, tasks D and E in the example of FIG. 10 may be regarded by the system with a lower level of trust, since these tasks are amenable to modification by the OS.

In the example of FIG. 10, task D is directly subject to management by trusted task A and by the OS, as shown by row RPR 4 in section 1030. In contrast, as shown by row RPR 5 in section 1030, task E is directly subject to management only by the OS, which in turn is directly subject to management by trusted task A (illustrating two levels of management). It will be appreciated that other combinations of management, and other numbers of levels of management, may also be implemented using permissions tables such as described herein.

Figure 11:
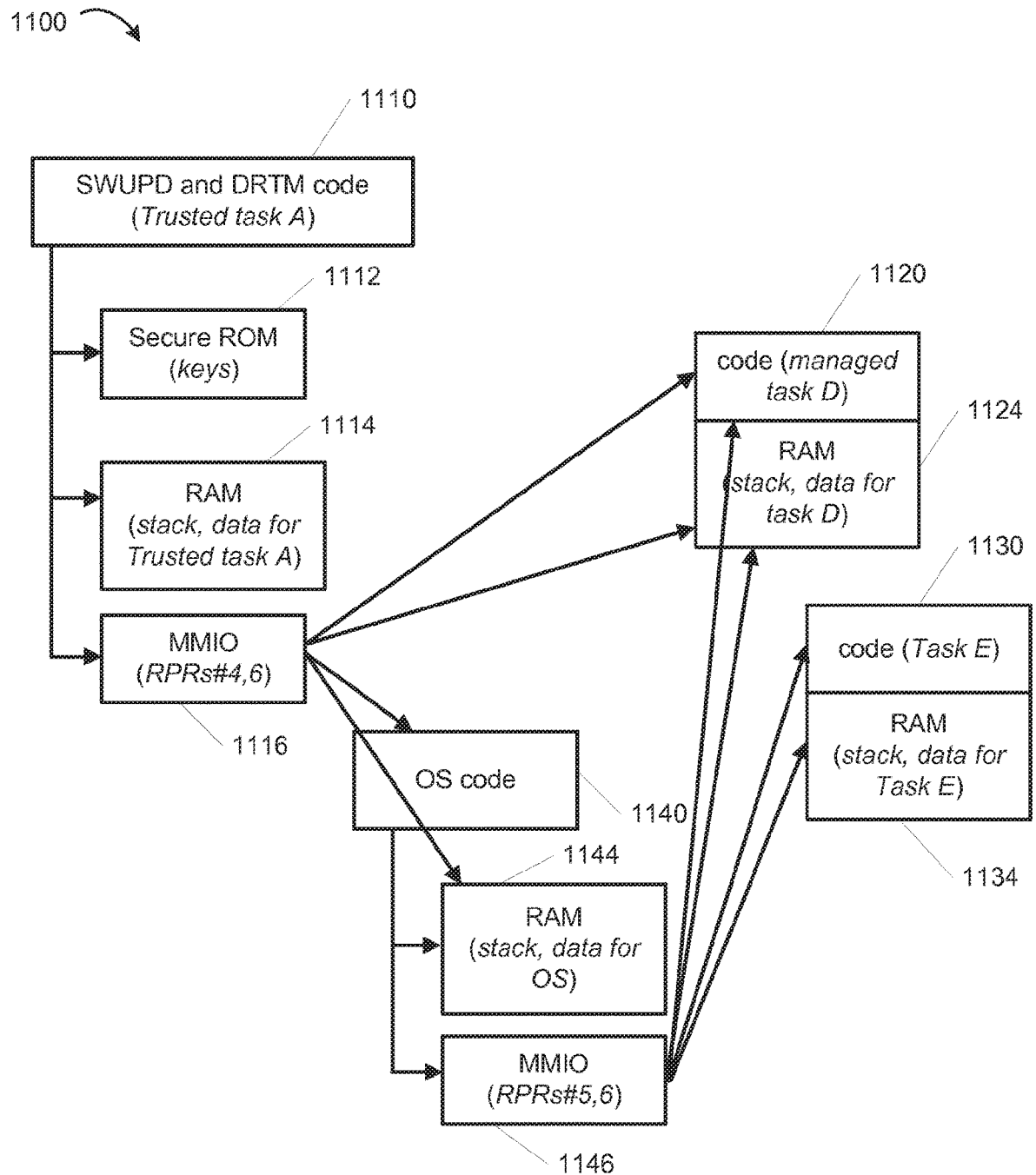
FIG. 11 shows an example of an operating system kernel protected by an execution-aware MPU.

FIG. 11 shows an example of an operating system kernel protected by an execution-aware MPU. In block diagram 1100, code for an operating system 1140 has been configured as a managed trusted task. Another trusted task A (1110) manages OS 1140 by providing software update and DRTM support for OS 1140. Trusted task A also provides monitoring services to task D, such as scanning for signatures of malware or monitoring for unusual behavior (1120).

Trusted task A has permission to access authentication keys or other cryptographic keys in a secure ROM memory region 1112. Trusted task A also has permission to access a working memory space 1114, and region protection registers 1116 that define permissions to other memory spaces. The other memory spaces are memory regions that hold code for task D (1120) and OS 1140, along with the working spaces 1124, 1144 for those tasks. These permissions support the ability of trusted task A to provide software update and DRTM services to the OS and to task D.

In the example of FIG. 11, task D is supported by the OS as well as by trusted task A. The OS also supports task E.

The permissions in registers 1116 (RPR #4) may be matched to procedures for typically invoking the OS, e.g., using context switches and/or interrupts. The permissions in registers 1146 may be matched to procedures for installing and/or updating software by the OS. The permissions relating to and used by OS 1140 may be configured to manage portions of the MPU at runtime (RPRs #5, 6 in FIGS. 10-11). The OS may use this access in manners similar to techniques by which an MPU is used in embedded systems. For example, OS 1140 may be configured to improve resilience against software bugs unexpectedly manipulating OS or task memory, (2) provide memory protection to OS user space tasks, and (3) re-program available RPRs during task switching to accommodate more OS tasks than available RPRs.

To avoid conflicting RPR usage by different trusted tasks, the necessary write-access to RPRs may be defined at design time, at platform initialization time, or the trusted tasks may use trusted inter-process communications to mediate RPR access at runtime.

In various implementations of a system, critical RPRs may be configured as read-only or otherwise locked with respect to access by OS 1140. The OS can therefore change only a specific subset of the MPU registers. In various implementations, locking can also be used to prevent access by other software elements as well as to prevent access by the OS. In other implementations, the OS may be treated as a trusted software module with access to some execution-aware MPU regions. While the OS may be configured to change only a specific subset of the MPU registers, a number of other entities such as a DRTM service may run in parallel to the OS. Similarly, two or more operating systems may run in parallel, with each accessing their own exclusively-owned software elements, peripherals, and MPU regions.

It will be appreciated that a variety of configurations, modifications, and alternatives may be implemented using the examples described above. For example, implementations of an execution-aware MPU may be used to construct complex trusted tasks such as device drivers and platform management services. Some examples of software security services that may be provided by such modules include secure updates, dynamic root of trust for measurement (DRTM), memory sharing, and delegating memory regions to an OS.

In various implementations, MPU 120 from FIG. 1 may be used to enforce access control on MMIO address space, allowing the configuration of trusted tasks with certain exclusive access rights to peripherals. Moreover, various execution-aware MPUs are themselves peripherals, and their configurations may in turn be subject to MMIO access validation by the MPU. Thus, various implementations of a system or system on a chip may be configured so that trusted tasks may be deployed with partial MPU configuration capabilities. Various trusted tasks may provide multiple levels of indirection, allowing one trusted software module to govern the MPU register access of another trusted software module, which may in turn use MPU registers to manage additional trusted tasks.

A variety of applications may be achievable with such trusted tasks, including applications that might otherwise require explicit hardware support. These software modules may be configured, for example, to provide DRTM applications (secure launch of isolated software elements at runtime), for which prior systems required hardware facilities to measure and launch such software. Similarly, these software modules may be used to enable low-cost embedded systems in which secure device drivers are isolated from the OS. In various applications, the cost constraints on a semiconductor device may exclude the use of virtualization or other custom or device-specific protective measures, which could otherwise be available from the hardware in more capable platforms. The use of trusted tasks as described above may provide helpful protection in such cost-constrained applications. Some secure platform services such as watchdog timers have typically been realized in hardware; the trusted tasks may provide a pure software implementation of a watchdog timer on top of execution-aware MPU access control enforcement.

Execution-aware memory protection may allow the association and automated hardware-based access control enforcement of code and data memory regions in computer systems. One instantiation is as an execution-aware MPU for embedded systems. Various tasks or programs may use execution-aware MP to protect their code and data regions in such a way that only authorized code may access the respective program's data memory regions. Since many embedded systems use memory-mapped I/O for interaction with platform peripherals, which may allow access control and data channels of peripherals as part of the device's overall (data) memory space, the execution-aware memory protection scheme may also be able to perform access control on the MMIO regions of peripherals.

Figure 12:
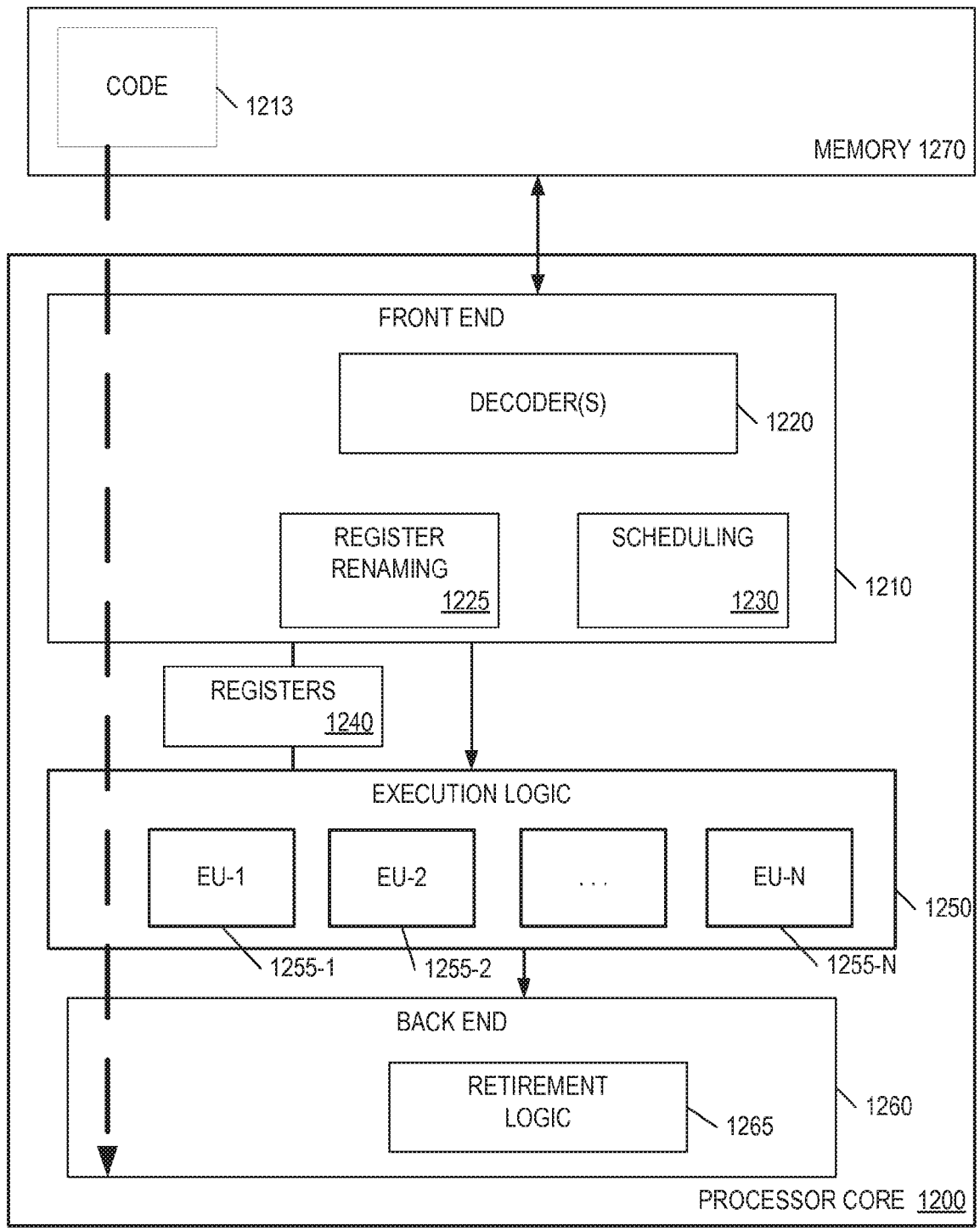
FIG. 12 illustrates one example of a processor core 1200.

FIG. 12 illustrates one example of a processor core 1200. In various implementations, processor core 1200 has an architecture suitable for low-cost production. Processor core 1200 may be a core for various types of processors or processing elements, such as an embedded processor, a micro-processor, a digital signal processor (DSP), a network processor, or other circuit device for executing code. Although only one processor core 1200 is illustrated in FIG. 12, a processing element may alternatively include more than one processor core. Processor core 1200 may be a single-threaded core or may be multithreaded in that it may include more than one hardware thread context (or "logical processor") per core.

FIG. 12 also illustrates a memory 1270 coupled to the processor core 1200. Memory 1270 may be any of a wide variety of types of memory circuits. Memory 1270 may include one or more instruction codes 1213 to be executed by processor core 1200. Processor core 1200 is configured to follow a program sequence of instructions indicated by code 1213. Each instruction enters a front-end portion 1210 of the processor core and is processed by one or more decoders 1220 in the core. A decoder may generate as its output a micro operation such as a fixed width micro operation in a predefined format, or may generate other instructions, microinstructions, or control signals, which reflect the original code instruction. Front end 1210 may also include register renaming logic 1225 and scheduling logic 1230, which generally allocate resources and queue operations for execution.

Processor core 1200 includes one or more registers 1240 configured to store data within processor core 1200. Registers 1240 may include general registers, one or more stack pointers and other stack-related registers, one or more instruction pointers, and/or one or more volatile registers. In various implementations, registers 1240 includes registers configured to support execution-aware restrictions on access to memory addresses and/or to device addresses.

Processor core 1200 includes an execution logic 1250 that has a set of execution units 1255-1, 1255-2, through 1255-N. Some versions of a processor may include a number of execution units dedicated to specific functions or sets of functions. Other embodiments may include only one execution unit or one execution unit that can perform a particular function.

Execution logic 1250 performs the operations that are specified by code instructions. After completion of execution of the operations specified by the code instructions, a back end logic 1260 in the processor core retires the instructions of the code 1213. In one embodiment, the processor core 1200 allows out-of-order execution but requires in-order retirement of instructions. A retirement logic 1265 in back end logic 1260 may take a variety of forms as known to those of skill in the art (e.g., re-order buffers or the like). In this manner, processor core 1200 is transformed during execution of the code 1213, at least in terms of the output generated by the decoder, tables utilized by the register renaming logic 1225, and any registers 1240 modified by the operation of execution logic 1250.

Although not illustrated in FIG. 12, a processing element may include other elements on chip with processor core 1200. The processing element may include I/O control logic and/or may include I/O control logic integrated with memory control logic. The processing element may also include one or more caches.

Figure 13:
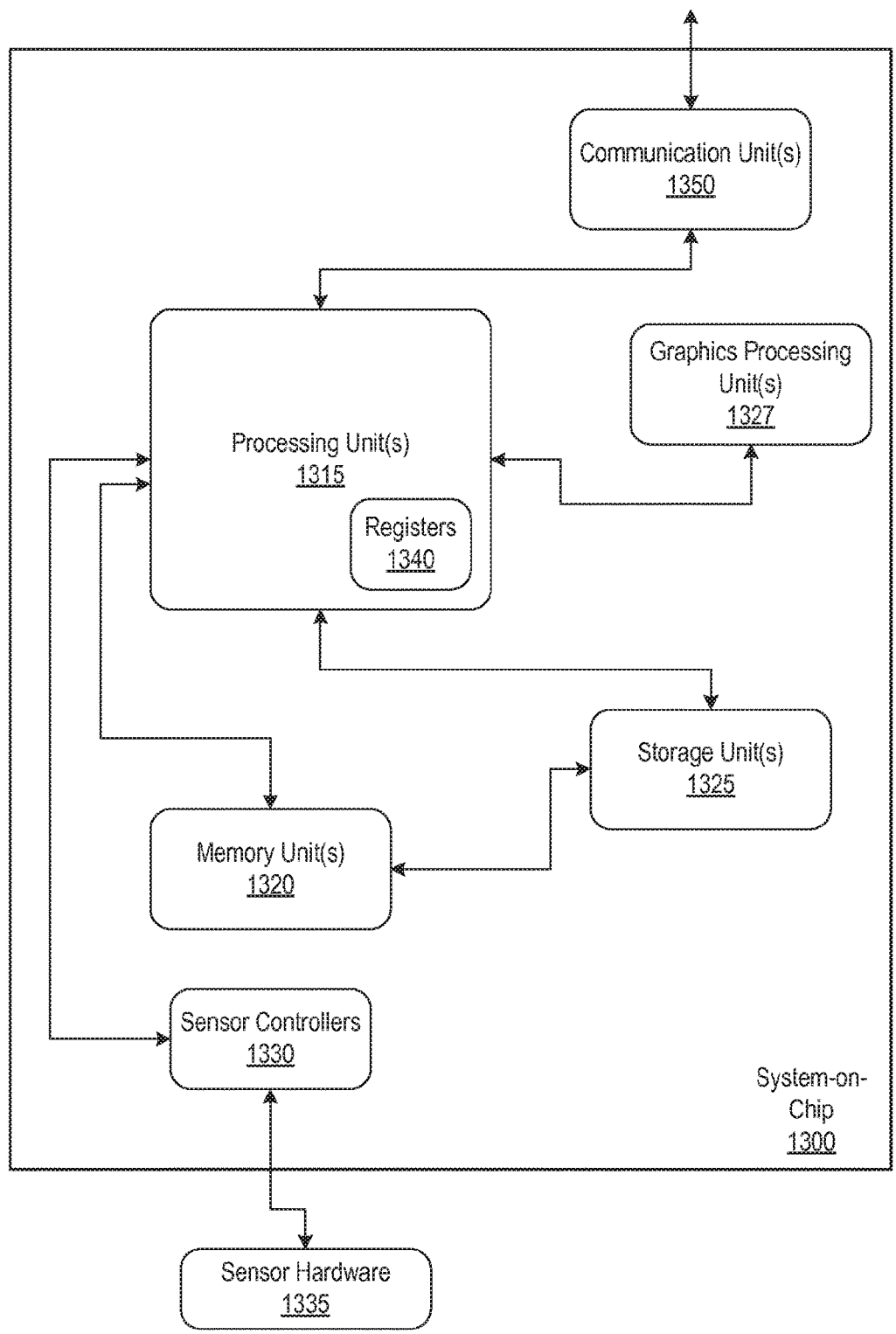
FIG. 13 is a block diagram of one example of a system-on-chip 1300.

FIG. 13 is a block diagram of one example of a system-on-chip 1300. System-on-chip (SoC) 1300 may be designed, in various implementations, as a single integrated circuit package. In some implementations, system-on-chip 1300 may be fabricated on a single semiconductor wafer substrate. In various examples, system-on-chip 1300 may be constructed using various SOC designs and manufacturing methods to create effectively a small computing system. Among other units, system-on-chip 1300 may include processing units 1315, memory units 1320, storage units 1325, graphics processing units 1327, communication units 1350, and sensor controller units 1330. It should be noted that in other implementations, one or more of the various devices and modules in system-on-chip 1300 may be fabricated on separate semiconductor wafer substrates.

Additionally, system-on-chip 1300 may be coupled via sensor controller unit 1330 to sensor hardware 1335 such as cameras, microphones, antennas, speakers, touchscreens, keyboards, mice, location sensors, proximity sensors, light sensors, accelerometers, magnetic sensors, pressure sensors, temperature sensors, biometric security sensors, etc.

In some embodiments, instructions/software code may be stored in a combination of non-volatile/volatile memory such as storage units 1325 and memory units 1320. The instructions may be configured to be processed by processing unit 1315 in order to facilitate at least some of the functionality of system-on-chip 1300. Processing unit 1315 includes registers 1340, which may be configured to store data for quick accessibility by the processing unit. Registers 1340 may include one or more registers suitable for holding memory-access protection regulations.

In some embodiments, system-on-chip 1300 may be configured for use in a portable device, such as a mobile phone, a smartphone with a touchscreen, a tablet, a laptop, a hybrid device, another communication device, etc. In some embodiments, system-on-chip 1300 may be configured for use in an embedded device such as a microcontroller for use in household appliances, industrial equipment, toys, medical devices, automotive processing units, etc.

Figure 14:
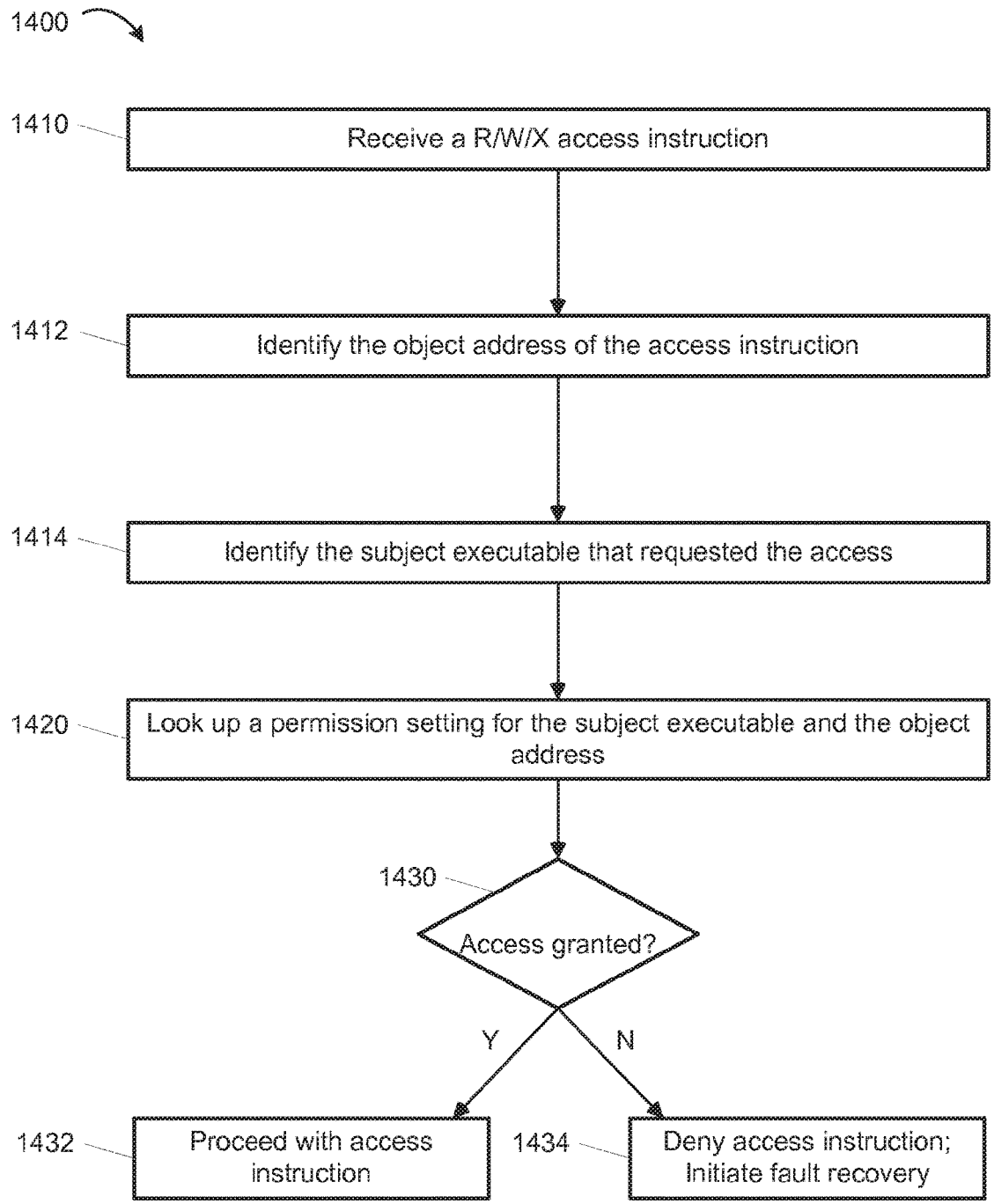
FIG. 14 is a flow diagram of one example of a procedure 1400 for regulating access to addresses with execution-aware memory protection.

FIG. 14 is a flow diagram of one example of a procedure 1400 for regulating access to addresses with execution-aware memory protection. The procedure commences in act 1410 by receiving an access instruction. The access instruction may be generated, for example, by a processor such as an embedded processor or other processor. The instruction may be received by a memory protection unit (MPU). In various implementations, the instruction is received by an execution-aware MPU that has been fabricated on a semiconductor substrate along with the processor that generates the access instruction. In various implementations, the processor and MPU are configured so that the MPU regulates access by the processor to memory locations and/or to memory-mapped IO (MMIO) locations. In various implementations, the processor and MPU are configured in hardware so that the processor is unable to complete an access if the MPU denies that access to the processor. The access instruction may include, for example, a request by the processor to read, write, or execute contents of one or more memory locations.

The access instruction may include, or may be associated with, one or more addresses of memory locations to be accessed. In act 1412, procedure 1400 recognizes this address(es) as the object of the access request. The access instruction may include, or may be associated with, an identifier or indicator of an executable software element that, while being executed by the processor, caused the processor to issue the access instruction. In act 1414, the procedure recognizes this executable as the subject of the access request.

In act 1420, the procedure performs a lookup to determine a permission setting that relates the subject software element and the object address(es). For example, the lookup may retrieve permission information (the output of the lookup) based on the subject software element and the object address(es) (the inputs of the lookup). In various implementations, the output is an indication such as R; RW; RWX; X; RX; or other indicator (or binary equivalent thereof) of whether the subject software element is permitted to have read only; read and write; read, write and execute; execute only; or other combination of read/write/execute access for the object address(es).

As another example, the lookup may retrieve a binary indicator (e.g., an allow/forbid output of the lookup) based on the subject software element, the object address(es), and the type of access being requested (e.g., R, W, X) (the inputs of the lookup). In various implementations, the lookup consults permission information that is stored in a memory. The memory may be a configured with some hardware-implemented protection, such as register memory, or register memory within a MPU. In various implementations, the memory stores the permission information in the form of a lookup table. In various implementations, the memory stores the permission information in registers that correspond to object address ranges or subject executables, or both.

In act 1430, a decision is made based on the lookup. If the lookup in act 1420 indicated that the request in the access instruction is to be granted, then the procedure advances to act 1432, in which the instruction is executed. Otherwise, if the lookup in act 1420 indicated that the request in the access instruction is denied, then the procedure advances to act 1434, in which the instruction is not executed. If the access request is denied, procedure 1400 may further initiate a fault recovery operation or other protective procedure.

ADDITIONAL NOTES AND EXAMPLES

Example 1 includes a system for managing processes in a computing device. The system includes a memory, a processor, and a protection circuit. The memory includes a plurality of data regions. The processor is configured to execute a plurality of executable programs. The protection circuit is coupled to the processor and to the memory and is configured to regulate memory access by the processor based at least on permission data. The permission data includes information regarding a set of the data regions in the memory. The permission data also includes information regarding a set of the executable programs The permission data also includes information regarding relationships between the set of data regions and the set of executable programs.

Among the permission data are various access grants and various access denials. One of the access grants is for access to a first memory region by a first executable program. One of the access grants is for access to a second memory region by a second executable program. One of the access grants is for access to the second memory region by the first executable program.

Example 2 may include the system of example 1, with the protection circuit including an execution-aware memory protection unit.

Example 3 may include the system of example 2, with the permission data being stored in registers in the execution-aware memory protection unit.

Example 4 may include the system of any one of examples 1 to 3, with the processor being configured to execute an operating system, and with the first and second executable programs being configured to be executed without reliance on the operating system.

Example 5 may include the system of any one of examples 1 to 4, with the permission data denying access to the first memory region by executables other than the first executable program. The permission data may include an access grant to a third memory region by the second executable program. The permission data may also deny access to the third memory region by executables other than the second executable program, Example 6 includes a system for managing processes in a computing device. The system includes a memory, a hardware device, a processor, and a protection circuit. The memory includes a plurality of data regions. The hardware device is accessible by the processor through memory-mapped I/O communication. The processor is configured to execute a plurality of executable programs. The protection circuit is coupled to the processor and to the memory and to the hardware device. The protection circuit is configured to regulate access by the processor to the hardware device access and to the memory. Regulation by the protection circuit is based at least on permission data.

The permission data includes information regarding a set of the data regions in the memory. The permission data also includes information regarding a set of the executable programs The permission data also includes information regarding relationships between the set of data regions and the set of executable programs.

The permission data further includes information regarding one or more memory-mapped addresses assigned to the hardware device. The permission data also includes information regarding relationships between the memory-mapped addresses and the set of executable programs, Among the permission data are various access grants and various access denials. One of the access grants is for access to the memory-mapped addresses assigned to the hardware device exclusively by a first executable program among the set of the executable programs. One of the access denials is for access to the hardware device by executable programs other than the first executable program.

Example 7 may include the system of example 6, the hardware device includes a timer circuit. The first executable program is configured to reset the timer circuit. The first executable program is configured to provide a watchdog timer service to the executable programs other than the first executable program.

Example 8 may include the system of any one of examples 6-7. The first executable program is configured to configure an interrupt event to be initiated in response to a timeout condition of the timer circuit.

Example 9 may include the system of any one of examples 6-8. The protection circuit includes an execution-aware memory protection unit.

Example 10 may include the system of example 9. The permission data is stored in registers in the execution-aware memory protection unit.

Example 11 may include the system of any one of examples 6-10. The processor is configured to execute an operating system. The first executable program is configured to be executed without reliance on the operating system.

Example 12 may include the system of any one of examples 6-11. The permission data includes denies access to the memory-mapped addresses assigned to the hardware device by all executable programs, among the set of the executable programs, other than the first executable program.

Example 13 may include the system of any one of examples 6-12. The permission data includes an access grant to a first memory region by the first executable program. The permission data includes an access grant to a second memory region by a second executable program. The permission data includes an access grant to the second memory region by the first executable program.

Example 14 may include the system of any one of examples 6-13. The permission data includes an access grant to a first memory region by the first executable program. The permission data includes an access grant to a second memory region by a second executable program. The permission data includes an access grant to the second memory region by the first executable program.

Example 15 includes a system for managing processes in a computing device. The system includes a memory, a processor, and a protection circuit. The memory includes a first set of memory locations. The processor is configured to execute a plurality of executable programs.

The protection circuit is coupled to the processor and to the memory and includes a second set of memory locations. The protection circuit is configured to store permission data in the second set of memory locations. The permission data includes information regarding the first and second sets of memory locations. The permission data includes information regarding a set of the executable programs. The permission data includes information regarding relationships between (a) the set of the executable programs and (b) the first and second sets of memory locations. The protection circuit is configured to regulate access by the processor to the first and second sets of memory locations based at least on the permission data in the second set of memory locations.

Example 16 may include the system of example 15. The permission data includes a write-access grant by a first executable code to a first target region in the memory. The first executable code includes a software update service. The first target region stores permissions for accessing a second executable code. The first executable code is configured to revise the second executable code.

Example 17 may include the system of example 16. The first executable code is configured to temporarily revise the permissions for accessing the second executable code, prior to revising the second accessible code.

Example 18 may include the system of any one of examples 16-17. The first executable code is configured to revise the second executable code based on an update for the second executable code.

Example 19 may include the system of example 18. The first executable code is configured to authenticate the update for the second executable code.

Example 20 may include the system of example 19. The first executable code is configured to calculate a signature of a least a portion of the update for the second executable code. The first executable code is configured to authenticate the update for the second executable code based at least upon the signature.

Example 21 may include the system of example 19. The first executable code is configured to disable the update for the second executable code in response to a failed authentication of the second executable code.

Example 22 may include the system of any one of examples 15-21. The permission data includes a write-access grant by a first executable code to a first target region in the memory. The first target region stores permissions for accessing a second target region. The second target region stores a second executable code. The permission data includes a write-access grant by the first executable code to a third target region in the memory. The third target region stores permissions for accessing a fourth target region, and wherein the fourth target region stores data used by execution of the second executable code. The first executable code is configured to calculate a measurement of the second executable code.

Example 23 may include the system of example 22. The measurement is based at least on a cryptographic checksum of attributes of the second executable code.

Example 24 may include the system of example 23. The attributes may include configuration parameters of the second executable code. The attributes may include startup parameters of the second executable code. The attributes may include at least a portion of the second executable code itself.

Example 25 may include the system of any one of examples 22-24. The first executable code is configured to store the measurement of the second executable code in a secure location for subsequent use in validation of the second executable code.

Example 26 may include the system of any one of examples 15-25. The permission data includes a write-access grant by a first executable code to a first target region in the memory. The first executable code is configured to install an operating system into the first target region. The permission data includes a write-access grant by the operating system to a second memory region in the memory. The operating system is configured to install an OS-managed executable code into the second memory region.

Example 27 may include the system of any one of examples 15-26. The protection circuit includes an execution-aware memory protection unit.

Example 28 may include the system of example 27. The permission data is stored in registers in the execution-aware memory protection unit.

Example 29 may include the system of any one of examples 15-28. The processor is configured to execute an operating system. At least one executable program among the set of the executable programs is configured to be executed without reliance on the operating system.

Example 30 may include the system of any one of examples 15-29. The permission data includes a write-access grant by a first executable code to a first target region in the memory. The first target region stores permissions for accessing a second executable code. The first executable code is configured to revise the second executable code. The permission data deny access to the first target region by executables other than the first executable code.

Example 31 may include the system of any one of examples 15-30. The permission data includes an access grant to a first memory region by a first executable program among the plurality of executable programs. The permission data includes an access grant to a second memory region by a second executable program among the plurality of executable programs. The permission data includes an access grant to the second memory region by the first executable program.

Example 32 is a method of managing processes in a computing device. The method includes receiving access requests from a processor. The method includes determining, for each access request, a subject executable that caused the processor to issue the access request, and an object address to which the access is directed. The method includes regulating the access requests based at least upon permission data. The permission data includes an access grant to a first memory region by a first subject executable program. The permission data includes an access grant to a second memory region by a second subject executable program. The permission data includes an access grant to the second memory region by the first subject executable program.

Example 33 may include the method of example 32. Determination of the subject executable is based on extracting currently-executing code information from the processor.

Example 34 may include the method of any one of examples 32-33. Determination of the subject executable is performed by an execution-aware memory protection unit.

Example 35 may include the method of example 34. The permission data is stored in registers in the execution-aware memory protection unit.

Example 36 may include the method of any one of examples 32-35. The processor is configured to execute an operating system. A plurality of subject executables are configured to be executed without reliance on the operating system.

Example 37 may include the method of any one of examples 32-36. The permission data deny access to the first memory region by executables other than the first subject executable program. The permission data includes an access grant to a third memory region by the second subject executable program. The permission data deny access to the third memory region by executables other than the second subject executable program.

Example 38 may include the method of any one of examples 32-37. The permission data grant access by the first subject executable program to memory-mapped IO addresses for a timer circuit. The timer circuit is fabricated on a semiconductor substrate along with the processor. The permission data deny access by executable programs other than the first subject executable program to memory-mapped IO addresses for the timer circuit. The first subject executable program is configured to reset the timer circuit. The first subject executable program is configured to provide a watchdog timer service to the executable programs other than the first subject executable program.

Example 39 may include the method of example 38. The first subject executable program is configured to configure an interrupt event to be initiated in response to a timeout condition of the timer circuit.

Example 40 includes at least one non-transitory, machine-accessible storage medium. Instructions are stored on the medium. The instructions are configured so that when they are executed on a machine, they to cause the machine to receive access requests from a processor The instructions are configured so that when they are executed on a machine, they to cause the machine to determine, for each access request, (a) a subject executable that caused the processor to issue the access request, and (b) an object address to which the access is directed. The instructions are configured so that when they are executed on a machine, they to cause the machine to regulate the access requests based at least upon permission data. The permission data includes an access grant to a first memory region by a first subject executable program. The permission data includes an access grant to a second memory region by a second subject executable program. The permission data includes an access grant to the second memory region by the first subject executable program.

Example 41 may include the storage medium of example 40. Regulation of the access requests is performed by an execution-aware memory protection unit.

Example 42 may include the storage medium of example 41. The permission data is stored in registers in the execution-aware memory protection unit.

Example 43 may include the storage medium of any one of examples 40-42. The processor is configured to execute an operating system. The first and second subject executable programs are configured to be executed without reliance on the operating system.

Example 44 may include the storage medium of any one of examples 40-43. The permission data deny access to the first memory region by executables other than the first subject executable program. The permission data includes an access grant to a third memory region by the second subject executable program. The permission data deny access to the third memory region by executables other than the second subject executable program.

The foregoing description presents one or more embodiments of various systems and methods. It should be noted that these and any other embodiments are exemplary and are intended to be illustrative of the invention rather than limiting. While the invention is widely applicable to various types of technologies and techniques, a skilled person will recognize that it is impossible to include all of the possible embodiments and contexts of the invention in this disclosure.

Furthermore, those skilled in the art will recognize that boundaries between the functionality of the above described acts, steps, and other operations are merely illustrative. The functionality of several operations may be combined into a single operation, and/or the functionality of a single operation may be distributed in additional operations. Moreover, alternative embodiments may include multiple instances of a particular operation or may eliminate one or more operations, and the order of operations may be altered in various other embodiments. Those of skill will appreciate that some of the illustrative logical blocks, modules, circuits, and steps described in connection with the embodiments disclosed herein may be implemented as hardware, firmware, software, or combinations of those. To illustrate this interchangeability of hardware, firmware, and software, some illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the spirit or scope of the present invention.

Some benefits and advantages that may be provided by some embodiments have been described above. These benefits or advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. While the foregoing description refers to particular embodiments, it should be understood that the embodiments are illustrative and that the scope of the invention is not limited to these embodiments. Many variations, modifications, additions and improvements to the embodiments described above are possible.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, application programs, operating system software, firmware, subroutines, application program interfaces (API), or others, or any combination thereof.

Some systems or supporting systems may be implemented, for example, using a machine or tangible computer-readable medium or article which may store an instruction or a set of instructions that, if executed by a machine, may cause the machine to perform a method and/or operations in accordance with the embodiments. In some implementations, one or more instances of these programs may be executed on one or more separate computer systems or separate processor units, e.g., in a distributed system, a multi-processor architecture, a multi-core architecture. Thus, although certain steps have been described as being performed by certain devices, software programs, processes, or entities, this need not be the case and a variety of alternative implementations will be understood by those having ordinary skill in the art. Instructions may be stored on machine-readable medium such as a magnetic medium (e.g., hard disk, floppy disk, tape), a semiconductor medium (e.g., flash memory, RAM), an optical medium (e.g., CD, DVD), or others, or combinations thereof. One or more aspects of a system may include representative instructions stored on a machine-readable medium that represents various logic within a processor, which when read by a machine causes the machine to fabricate logic to perform the techniques described herein. The instructions may also be carried in a communications medium conveying signals encoding the instructions.

Various actions described herein involve operations performed by electronic computing devices that manipulate and/or transform data represented as physical quantities (e.g., electronic) within the computing system's registers and/or memories into other data similarly represented as physical quantities within the computing system's memories, registers or other such information storage, transmission, or display devices.

What is claimed is:

1. At least one non-transitory machine readable medium including instructions that, when executed by processing circuitry, to cause the processing circuitry to perform operations comprising:
   receiving an access request from a processor;
   processing the access request to determine an executable that caused the processor to issue the access request and an object address to which the access is directed; and
   granting the access request when permission data for the object address identifies the executable and denying the access request otherwise, wherein the permission data comprises an access grant to a first memory region by the executable, the permission data comprises an access grant to a second memory region by a second executable, and the permission data comprises an access grant to the second memory region by the executable.

2. The storage medium of claim 1, wherein an execution-aware memory protection unit performs the granting or denying of the access request.

3. The storage medium of claim 2, wherein the permission data is stored in registers in execution-aware memory protection unit.

4. The storage medium of claim 1, wherein the executable is arranged to run:
   on hardware of a machine that includes the processor; and
   outside of an operating system executing on the processor.

5. The storage medium of claim 1, wherein the permission data denies access to the first memory region by executables other than the executable program, and wherein the permission data denies access to a third memory region by executables other than the second executable program.

6. A system for managing processes in a computing device, the system comprising:
   a memory comprising a first set of memory locations;
   a processor configured to execute a plurality of executable programs; and
   a protection circuit, communicatively coupled to a processor and a memory of the system when in operation, the protection circuit including:
   a second set of memory locations independent from the first set of memory locations in the memory, the second set of memory locations including permission data, the permission data including information regarding:
      the first and second sets of memory locations;
      a set of the executable programs; and
      relationships between the set of the executable programs, and the first and second sets of memory locations; and
   circuitry to regulate processor access to the first and second sets of memory locations based on the permission data, wherein the permission data includes an access grant to a first memory region by a first executable program, an access grant to a second memory region by a second executable program, and an access grant to the second memory region by the first executable program.

7. The system of claim 6, wherein the permission data includes a write-access grant by the first executable program to the first target region in the memory, the first executable program includes a software update service, the first target region stores permissions for accessing the second executable program, and the first executable program is configured to revise the second executable program.

8. The system of claim 7, wherein the first executable program is configured to temporarily revise the permissions for accessing the second executable program, prior to revising the second executable program.

9. The system of claim 7, wherein the first executable program is configured to revise the second executable program based on an update for the second executable program.

10. The system of claim 6, wherein the permission data includes a write-access grant by the first executable program to the first target region in the memory, wherein the first target region stores permissions for accessing a second target region, and wherein the second target region stores the second executable program, wherein a third target region in the memory stores permissions for accessing a fourth target region, wherein the fourth target region stores data used by execution of the second executable program, and wherein the first executable program is configured to calculate a measurement of the second executable program.

11. The system of claim 10, wherein the measurement is based at least on a cryptographic checksum of attributes of the second executable program.

12. The system of claim 11, wherein the attributes include one or more of:
   configuration parameters of the second executable program;
   startup parameters of the second executable program; or
   at least a portion of the second executable program.

13. The system of claim 10, wherein the first executable program is configured to store the measurement of the second executable program in a secure location for subsequent use in validation of the second executable program.

14. The system of claim 6, wherein the permission data includes a write-access grant by the first executable program to the first target region in the memory, the first executable program is configured to install an operating system into the first target region, the permission data comprises a write-access grant by the operating system to the second memory region in the memory, and the operating system is configured to install an operating system-managed executable program into the second memory region.

15. A system for managing processes in a computing device, the system comprising a protection circuit, coupled to a processor and a memory when in operation, the protection circuit configured to:

receive a memory access request, to the memory, from the processor;

process the access request to determine an executable program that caused the processor to issue the memory access request and an object address to which the access is directed; and grant the memory access request when permission data for the object address identifies the executable program and deny the memory access request otherwise, wherein the permission data includes information:

regarding a set of the data regions in the memory;

regarding a set of executable programs; and regarding relationships between the set of data regions and the set of executable programs; and wherein the permission data includes an access grant to a first memory region by the executable program, an access grant to a second memory region by a second executable program, and an access grant to the second memory region by the executable program.

16. The system of claim 15, comprising the memory and the processor.

17. The system of claim 15, wherein:

the permission data denies access to the first memory region by executable programs other than the executable program, and wherein the permission data denies access to a third memory region by executable programs other than the second executable program.

18. The system of claim 15, wherein the protection circuit includes an execution-aware memory protection unit.

19. The system of claim 18, wherein the permission data is stored in registers in the execution-aware memory protection unit.

20. The system of claim 15, wherein the executable program is configured to run on hardware of the system without reliance on an operating system executing on the processor.

21. A method of managing processes in a computing device, the method comprising:

receiving access requests from a processor;

determining, for each access request:

a subject executable that caused the processor to issue the access request; and an object address to which the access is directed; and regulating the access requests based at least upon permission data, wherein the permission data comprises an access grant to a first memory region by a first subject executable program;

wherein the permission data comprises an access grant to a second memory region by a second subject executable program; and wherein the permission data comprises an access grant to the second memory region by the first subject executable program.

22. The method of claim 21, wherein determination of the subject executable is based on extracting currently-executing code information from the processor.

23. A system for managing processes in a computing device, the system comprising:

a memory comprising a plurality of data regions;

a hardware device, wherein the hardware device is accessible through memory-mapped I/O communication;

a processor configured to execute a plurality of executable programs; and a protection circuit, coupled to the processor and to the memory and to the hardware device, wherein the protection circuit is configured to regulate access by the processor to the hardware device access and to the memory, regulation by the protection circuit is based at least on permission data, the permission data comprises information regarding a set of the data regions in the memory, regarding a set of the executable programs, and regarding relationships between the set of data regions and the set of executable programs, the permission data comprises information regarding one or more memory mapped addresses assigned to the hardware device, and regarding relationships between the memory-mapped addresses and the set of executable programs, the permission data comprises an exclusive access grant to the memory-mapped addresses assigned to the hardware device by a first executable program among the set of the executable programs, and the permission data comprises access denials to the hardware device by executable programs other than the first executable program.

24. The system of claim 23, wherein:

the hardware device comprises a timer circuit;

the first executable program is configured to reset the timer circuit; and the first executable program is configured to provide a watchdog timer service to the executable programs other than the first executable program.

25. The system of claim 24, wherein:

the timer circuit is fabricated on a semiconductor substrate along with the processor; and the first executable program is configured to configure an interrupt event to be initiated in response to a timeout condition of the timer circuit.

* * * * *